(12) United States Patent
Emura

(10) Patent No.: US 10,093,389 B2
(45) Date of Patent: Oct. 9, 2018

(54) BICYCLE FRONT SPROCKET, BICYCLE CRANK ASSEMBLY, AND BICYCLE DRIVE TRAIN

(71) Applicant: SHIMANO INC., Sakai (JP)

(72) Inventor: Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/353,673

(22) Filed: Nov. 16, 2016

(65) Prior Publication Data

US 2018/0134340 A1   May 17, 2018

(51) Int. Cl.

| | |
|---|---|
| *F16H 7/06* | (2006.01) |
| *F16H 55/12* | (2006.01) |
| *F16H 55/30* | (2006.01) |
| *F16H 7/20* | (2006.01) |
| *F16H 55/36* | (2006.01) |
| *B62M 9/10* | (2006.01) |
| *B62M 1/36* | (2013.01) |

(52) U.S. Cl.
CPC ............... *B62M 9/10* (2013.01); *B62M 1/36* (2013.01); *F16H 55/30* (2013.01)

(58) Field of Classification Search
CPC ... Y10T 74/2165; B62M 9/105; B62M 3/003; B62M 3/00; F16H 55/30
USPC ........................................ 474/160, 156, 152
See application file for complete search history.

(56) References Cited

U.S. PATENT DOCUMENTS

| | | | | |
|---|---|---|---|---|
| 624,635 | A * | 5/1899 | Fauber .................. | B62M 3/003 74/594.2 |
| 632,623 | A * | 9/1899 | Bartlett .................... | F16H 7/06 301/2.5 |
| 643,349 | A * | 2/1900 | Fauber .................. | B62M 3/003 74/594.2 |
| 709,934 | A * | 9/1902 | Spence .................... | B62M 1/36 474/165 |
| 1,235,530 | A * | 7/1917 | Jones ..................... | B62K 19/34 384/458 |
| 3,550,465 | A * | 12/1970 | Tetsuo ................... | B62M 9/105 474/151 |
| 3,850,044 | A * | 11/1974 | Hagen ..................... | B62M 9/08 474/56 |
| 3,905,248 | A * | 9/1975 | Peyrard .................. | B62M 9/105 474/160 |
| 4,009,621 | A * | 3/1977 | Segawa .................. | B62M 9/105 474/160 |

(Continued)

Primary Examiner — Henry Y Liu
(74) Attorney, Agent, or Firm — Mori & Ward, LLP

(57) ABSTRACT

A bicycle front sprocket comprises a sprocket body and at least one sprocket tooth. The sprocket body includes a crank arm mounting portion including a first mounting axial surface facing toward an axial bicycle-center plane in an axial direction in a state where the bicycle front sprocket is mounted to the bicycle frame. The at least one sprocket tooth has a first chain-engagement axial surface facing toward the axial bicycle-center plane in the axial direction in a state where the bicycle front sprocket is mounted to the bicycle frame. The first chain-engagement axial surface is offset from the first mounting axial surface toward the axial bicycle-center plane in the axial direction. An axial distance is defined from the first mounting axial surface to the first chain-engagement axial surface in the axial direction and is equal to or larger than 6 mm.

31 Claims, 16 Drawing Sheets

(56) References Cited

U.S. PATENT DOCUMENTS

| | | | | |
|---|---|---|---|---|
| 4,044,621 A * | 8/1977 | McGregor, Sr. | B62J 13/00 | 474/144 |
| 4,173,154 A * | 11/1979 | Sawmiller | B62M 3/06 | 280/252 |
| 4,183,262 A * | 1/1980 | Segawa | B62K 19/34 | 192/64 |
| 4,201,120 A * | 5/1980 | Segawa | B62K 19/34 | 74/594.2 |
| 4,259,880 A * | 4/1981 | Ueno | B62M 9/105 | 474/160 |
| 4,380,445 A * | 4/1983 | Shimano | B62M 9/105 | 474/144 |
| 4,439,172 A * | 3/1984 | Segawa | B62M 9/105 | 474/144 |
| 4,453,924 A * | 6/1984 | Sugino | B62M 9/105 | 474/160 |
| 4,475,894 A * | 10/1984 | Sugino | B62M 9/105 | 474/144 |
| 4,586,914 A * | 5/1986 | Nagano | B62M 9/105 | 474/160 |
| 4,988,328 A * | 1/1991 | Iwasaki | B62M 9/105 | 474/160 |
| 5,003,840 A * | 4/1991 | Hinschlager | B62J 23/00 | 280/152.1 |
| 5,205,794 A * | 4/1993 | Browning | B62M 9/14 | 474/160 |
| 5,221,236 A * | 6/1993 | Raymer | B62M 9/16 | 474/109 |
| 5,285,701 A * | 2/1994 | Parachinni | B62M 3/003 | 280/259 |
| 5,480,359 A * | 1/1996 | Tani | B62M 3/003 | 474/160 |
| 5,907,980 A * | 6/1999 | Yamanaka | B25B 13/48 | 411/302 |
| 6,165,092 A * | 12/2000 | Bramham | B62M 9/16 | 474/134 |
| 6,173,982 B1 * | 1/2001 | Westergard | B62M 9/085 | 280/261 |
| 6,224,028 B1 * | 5/2001 | Tanaka | B01D 21/20 | 248/200 |
| 6,273,836 B1 * | 8/2001 | Thompson | B62M 9/06 | 474/160 |
| 6,361,461 B1 * | 3/2002 | Pusic | B62M 9/085 | 192/64 |
| 6,415,684 B1 * | 7/2002 | Yamanaka | B25B 13/48 | 74/594.1 |
| 6,443,033 B1 * | 9/2002 | Brummer | B62M 3/00 | 280/259 |
| 7,258,041 B2 * | 8/2007 | Yamanaka | B62M 3/003 | 74/594.2 |
| 7,591,746 B2 * | 9/2009 | Tarnopolsky | B62M 1/20 | 474/155 |
| 7,686,721 B2 * | 3/2010 | Tabe | B62M 9/105 | 474/116 |
| 7,753,815 B2 * | 7/2010 | Saifuddin | B62M 9/105 | 474/140 |
| D675,549 S * | 2/2013 | Noborio | | D12/123 |
| 8,616,084 B2 * | 12/2013 | Meggiolan | B62M 3/003 | 403/268 |
| 9,086,138 B1 * | 7/2015 | Emura | B62M 9/105 | |
| 9,308,963 B2 * | 4/2016 | Morelli | B62M 3/003 | |
| 9,387,905 B2 * | 7/2016 | Chonan | B62M 3/16 | |
| 9,469,371 B2 * | 10/2016 | Edwards | B62M 3/00 | |
| 9,669,899 B2 * | 6/2017 | Barefoot | B62M 9/00 | |
| 2002/0033069 A1 * | 3/2002 | Sechler | B62M 3/00 | 74/594.1 |
| 2002/0081052 A1 * | 6/2002 | Chi | B62M 3/003 | 384/545 |
| 2003/0032510 A1 * | 2/2003 | Lin | B62M 9/10 | 474/160 |
| 2003/0073531 A1 * | 4/2003 | Tseng | B62M 9/105 | 474/160 |
| 2003/0171180 A1 * | 9/2003 | Shahana | B62M 9/10 | 474/152 |
| 2005/0032596 A1 * | 2/2005 | Nonoshita | B62K 19/16 | 474/175 |
| 2005/0090349 A1 * | 4/2005 | Lee | B62M 9/105 | 474/160 |
| 2005/0282672 A1 * | 12/2005 | Nonoshita | B62M 9/105 | 474/161 |
| 2006/0046883 A1 * | 3/2006 | Nishimoto | B62J 13/02 | 474/144 |
| 2007/0054769 A1 * | 3/2007 | Hunter, Jr. | B62M 3/00 | 474/160 |
| 2007/0289405 A1 * | 12/2007 | French | B62M 3/00 | 74/594.1 |
| 2008/0176691 A1 * | 7/2008 | Saifuddin | B62M 9/105 | 474/160 |
| 2010/0064845 A1 * | 3/2010 | French | B62M 3/00 | 74/594.2 |
| 2011/0183805 A1 * | 7/2011 | Chan | B62M 6/50 | 475/254 |
| 2012/0172165 A1 * | 7/2012 | Schroedl | B62M 9/02 | 474/160 |
| 2013/0291678 A1 * | 11/2013 | Valle | B62M 3/00 | 74/594.2 |
| 2014/0047948 A1 * | 2/2014 | Edwards | B62M 3/00 | 74/594.1 |
| 2015/0239528 A1 * | 8/2015 | Barefoot | B62M 9/00 | 474/152 |
| 2015/0353155 A1 * | 12/2015 | Ribeiro Miranda | B62J 13/00 | 474/144 |
| 2016/0096588 A1 * | 4/2016 | Romeo | B62M 9/02 | 474/84 |
| 2016/0167737 A1 * | 6/2016 | Tokuyama | B62M 9/10 | 474/160 |
| 2016/0298752 A1 * | 10/2016 | Winans | F16H 55/303 | |
| 2016/0368561 A1 * | 12/2016 | Kamada | B62M 9/105 | |
| 2017/0101161 A1 * | 4/2017 | Cohen | B62M 11/02 | |
| 2017/0138439 A1 * | 5/2017 | Civiero | F16G 13/06 | |
| 2017/0233037 A1 * | 8/2017 | Hara | B62M 9/14 | 474/78 |
| 2017/0259880 A1 * | 9/2017 | Osborn | B62M 1/36 | |
| 2017/0292598 A1 * | 10/2017 | Moore | B22D 21/007 | |

* cited by examiner

BICYCLE FRONT SPROCKET, BICYCLE CRANK ASSEMBLY, AND BICYCLE DRIVE TRAIN

BACKGROUND OF THE INVENTION

Field of the Invention

The present invention relates to a bicycle front sprocket, a bicycle crank assembly, and a bicycle drive train.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a drive train.

SUMMARY OF THE INVENTION

In accordance with a first aspect of the present invention, a bicycle front sprocket comprises a sprocket body and at least one sprocket tooth. The sprocket body includes a crank arm mounting portion to be mounted to a bicycle crank arm. The crank arm mounting portion includes a first mounting axial surface facing toward an axial bicycle-center plane in an axial direction parallel to a rotational center axis of the bicycle front sprocket in a state where the bicycle front sprocket is mounted to the bicycle frame. The axial bicycle-center plane is defined to bisect a bicycle frame in the axial direction. The at least one sprocket tooth has a first chain-engagement axial surface facing toward the axial bicycle-center plane in the axial direction in a state where the bicycle front sprocket is mounted to the bicycle frame. The first chain-engagement axial surface is offset from the first mounting axial surface toward the axial bicycle-center plane in the axial direction. An axial distance is defined from the first mounting axial surface to the first chain-engagement axial surface in the axial direction, the axial distance being equal to or larger than 6 mm.

With the bicycle front sprocket according to the first aspect, it is possible to reduce an inclination of the bicycle chain extending between the bicycle front sprocket and a rear low-gear sprocket relative to the axial bicycle-center plane. This can improve chain-driving performance of the bicycle front sprocket.

In accordance with a second aspect of the present invention, the bicycle front sprocket according to the first aspect is configured so that the axial distance is equal to or smaller than 22.5 mm.

With the bicycle front sprocket according to the second aspect, it is possible to further reduce the inclination of the bicycle chain extending between the bicycle front sprocket and the rear low-gear sprocket relative to the axial bicycle-center plane. This can further improve the chain-driving performance of the bicycle front sprocket.

In accordance with a third aspect of the present invention, the bicycle front sprocket according to the second aspect is configured so that the axial distance is equal to or smaller than 11 mm.

With the bicycle front sprocket according to the third aspect, it is possible to reduce an inclination of the bicycle chain extending between the bicycle front sprocket and a rear top-gear sprocket relative to the axial bicycle-center plane. This can further improve the chain-driving performance of the bicycle front sprocket.

In accordance with a fourth aspect of the present invention, the bicycle front sprocket according to the first aspect is configured so that the axial distance is equal to or smaller than 9.5 mm and is equal to or larger than 8 mm.

With the bicycle front sprocket according to the fourth aspect, it is possible to reduce the inclination of the bicycle chain extending between the bicycle front sprocket and the rear low-gear sprocket relative to the axial bicycle-center plane. It is possible to reduce the inclination of the bicycle chain extending between the bicycle front sprocket and the rear top-gear sprocket relative to the axial bicycle-center plane. Furthermore, it is possible to reduce interference between the bicycle chain and the bicycle frame.

In accordance with a fifth aspect of the present invention, the bicycle front sprocket according to any one of the first to fourth aspects is configured so that the at least one sprocket tooth includes at least one first tooth and at least one second tooth. The at least one first tooth has a first chain engaging width defined in the axial direction. The at least one second tooth has a second chain engaging width defined in the axial direction. The second chain engaging width is smaller than the first chain engaging width.

With the bicycle front sprocket according to the fifth aspect, it is possible to improve chain-holding performance of the bicycle front sprocket.

In accordance with a sixth aspect of the present invention, the bicycle front sprocket according to the fifth aspect is configured so that the at least one first tooth has the first chain-engagement axial surface.

With the bicycle front sprocket according to the sixth aspect, it is possible to reduce the inclination of the bicycle chain extending between the bicycle front sprocket and a rear low-gear sprocket relative to the axial bicycle-center plane. This can improve chain-driving performance of the bicycle front sprocket.

In accordance with a seventh aspect of the present invention, the bicycle front sprocket according to the fifth or sixth aspects is configured so that the axial distance is equal to or larger than three times of the second chain engaging width.

With the bicycle front sprocket according to the seventh aspect, it is possible to reduce the inclination of the bicycle chain extending between the bicycle front sprocket and a rear low-gear sprocket relative to the axial bicycle-center plane. This can improve chain-driving performance of the bicycle front sprocket.

In accordance with an eighth aspect of the present invention, the bicycle front sprocket according to any one of the fifth to seventh aspects is configured so that the first chain engaging width is larger than an inner link space defined between an opposed pair of inner link plates of a bicycle chain and is smaller than an outer link space defined between an opposed pair of outer link plates of the bicycle chain. The second chain engaging width is smaller than the inner link space.

With the bicycle front sprocket according to the eighth aspect, it is possible to further improve the chain-holding function of the bicycle front sprocket.

In accordance with a ninth aspect of the present invention, the bicycle front sprocket according to any one of the first to eighth aspects is configured so that the sprocket body includes a radially extending portion extending from the crank arm mounting portion toward an outer periphery of the sprocket body in a radial direction perpendicular to the rotational center axis.

With the bicycle front sprocket according to the ninth aspect, it is possible to certainly transmit a rotational force from the crank arm to the bicycle front sprocket.

In accordance with a tenth aspect of the present invention, the bicycle front sprocket according to the ninth aspect is configured so that the radially extending portion includes at least four radially extending arms. The radially extending arms are spaced apart from each other in a circumferential direction defined about the rotational center axis.

With the bicycle front sprocket according to the tenth aspect, it is possible to adjust an axial position of the at least one sprocket tooth that defines a chain line of the bicycle chain relative to the bicycle crank arm by changing shapes of the radially extending arms. Accordingly, it is possible to set chain lines of the bicycle chain in accordance with the needs of the users by selectively attaching the bicycle front sprockets having different axial positions of the at least one sprocket tooth to the bicycle crank arm.

In accordance with an eleventh aspect of the present invention, the bicycle front sprocket according to any one of the first to tenth aspects is configured so that the crank arm mounting portion includes a plurality of mounting teeth configured to engage with a mounting boss of the bicycle crank arm in a state where the bicycle front sprocket is mounted to the bicycle crank arm.

With the bicycle front sprocket according to the eleventh aspect, it is possible to certainly transmit the rotational force from the crank arm to the bicycle front sprocket. Furthermore, it is possible to save total weight of coupling members coupling the bicycle front sprocket to the crank arm.

In accordance with a twelfth aspect of the present invention, the bicycle front sprocket according to any one of the first to eleventh aspects is configured so that the bicycle front sprocket is a solitary front sprocket.

With the bicycle front sprocket according to the twelfth aspect, it is possible to contribute saving of weight of the bicycle.

In accordance with a thirteenth aspect of the present invention, a bicycle crank assembly comprises a bicycle front sprocket and a bicycle crank arm. The bicycle front sprocket comprises a sprocket body and at least one sprocket tooth having an axial tooth-center plane defined to bisect a maximum axial width of the at least one sprocket tooth. The bicycle crank arm comprises an arm body and an abutment surface facing toward a bicycle bottom bracket assembly in an axial direction parallel to a rotational center axis of the bicycle front sprocket to abut against the bicycle bottom bracket assembly. The axial tooth-center plane is positioned farther from the arm body than the abutment surface in the axial direction. An axial distance is defined from the abutment surface to the axial tooth-center plane in the axial direction, the axial distance being equal to or larger than 1 mm.

With the bicycle crank assembly according to the thirteenth aspect, it is possible to reduce an inclination of the bicycle chain extending between the bicycle front sprocket and a rear low-gear sprocket relative to the axial bicycle-center plane. This can improve chain-driving performance of the bicycle front sprocket.

In accordance with a fourteenth aspect of the present invention, the bicycle crank assembly according to the thirteenth aspect is configured so that the axial distance is smaller than 5 mm.

With the bicycle crank assembly according to the fourteenth aspect, it is possible to reduce the inclination of the bicycle chain extending between the bicycle front sprocket and the rear low-gear sprocket relative to the axial bicycle-center plane. Furthermore, it is possible to reduce an inclination of the bicycle chain extending between the bicycle front sprocket and a rear top-gear sprocket relative to the axial bicycle-center plane.

In accordance with a fifteenth aspect of the present invention, the bicycle crank assembly according to the thirteenth aspect is configured so that the axial distance is equal to or larger than 3 mm and is equal to or smaller than 4 mm.

With the bicycle crank assembly according to the fifteenth aspect, it is possible to reduce the inclination of the bicycle chain extending between the bicycle front sprocket and the rear low-gear sprocket relative to the axial bicycle-center plane. It is possible to reduce the inclination of the bicycle chain extending between the bicycle front sprocket and the rear top-gear sprocket relative to the axial bicycle-center plane. Furthermore, it is possible to reduce interference between the bicycle chain and the bicycle frame.

In accordance with a sixteenth aspect of the present invention, the bicycle crank assembly according to any one of the thirteenth to fifteenth aspects is configured so that the bicycle front sprocket is a solitary front sprocket.

With the bicycle crank assembly according to the sixteenth aspect, it is possible to contribute saving of weight of the bicycle.

In accordance with a seventeenth aspect of the present invention, a bicycle drive train comprises the bicycle crank assembly according to any one of the thirteenth to sixteenth aspects and a multiple rear sprocket assembly including a plurality of bicycle rear sprockets.

With the bicycle drive train according to the seventeenth aspect, it is possible to provide a broad gear range.

In accordance with an eighteenth aspect of the present invention, the bicycle drive train according to the seventeenth aspect is configured so that the plurality of bicycle rear sprockets includes nine rear sprockets.

With the bicycle drive train according to the eighteenth aspect, it is possible to provide the broad gear range with saving weight of the bicycle drive train.

In accordance with a nineteenth aspect of the present invention, the bicycle drive train according to the seventeenth aspect is configured so that the plurality of bicycle rear sprockets includes eleven rear sprockets.

With the bicycle drive train according to the nineteenth aspect, it is possible to provide a broader gear range.

In accordance with a twentieth aspect of the present invention, the bicycle drive train according to the seventeenth aspect is configured so that the plurality of the bicycle rear sprockets includes twelve rear sprockets.

With the bicycle drive train according to the twentieth aspect, it is possible to provide a broader gear range.

In accordance with a twenty-first aspect of the present invention, a bicycle drive train comprises a bicycle crank arm assembly and a multiple rear sprocket assembly. The bicycle crank arm assembly comprises a bicycle front sprocket. The bicycle front sprocket comprises a sprocket body and at least one sprocket tooth having an axial tooth-center plane defined to bisect a maximum axial width of the at least one sprocket tooth. The multiple rear sprocket assembly is configured to be rotatably supported around a hub axle of a bicycle hub assembly. The multiple rear sprocket assembly has an axially-disposed center plane defined to face in an axial direction parallel to a rotational center axis of the multiple rear sprocket assembly. The axial tooth-center plane is axially outwardly spaced apart from the axially-disposed center plane by an axial distance equal to or smaller than 4 mm in the axial direction in a state where the multiple rear sprocket assembly is rotatably supported around the hub axle. The hub axle comprises a first axial frame abutment surface and a second axial frame abutment surface. The first axial frame abutment surface is configured to abut against a first part of a bicycle frame in the axial direction in a state where the bicycle hub assembly is mounted to the bicycle frame. The second axial frame abutment surface is configured to abut against a second part of the bicycle frame in the axial direction in the state where the bicycle hub assembly is mounted to the bicycle frame. A hub axial distance is defined between the first axial frame abutment surface and the second axial frame abutment surface in the axial direction, the hub axial distance being larger than or equal to 146 mm.

With the bicycle drive train according to the twenty-first aspect, it is possible to reduce an inclination of the bicycle chain extending between the bicycle front sprocket and a rear low-gear sprocket relative to the axial bicycle-center plane. This can improve chain-driving performance of the bicycle front sprocket in the bicycle frame to which the hub axle having high lateral rigidity is attachable.

In accordance with a twenty-second aspect of the present invention, the bicycle drive train according to the twenty-first aspect is configured so that the bicycle front sprocket is a solitary front sprocket.

With the bicycle drive train according to the twenty-second aspect, it is possible to contribute saving of weight of the bicycle.

In accordance with a twenty-third aspect of the present invention, a bicycle drive train comprises a bicycle crank arm assembly and a multiple rear sprocket assembly. The bicycle crank arm assembly comprises a bicycle front sprocket. The bicycle front sprocket comprises a front sprocket body and at least one front sprocket tooth having an axial front-tooth-center plane defined to bisect a maximum axial width of the at least one front sprocket tooth. The multiple rear sprocket assembly is configured to be rotatably supported around a hub axle. The multiple rear sprocket assembly comprises a largest rear sprocket. The largest rear sprocket comprises a rear sprocket body and at least one rear sprocket tooth having an axial rear-tooth-center plane defined to bisect a maximum axial width of the at least one rear sprocket tooth. The largest rear sprocket is positioned axially inwardly from the bicycle front sprocket in the axial direction. An axial tooth distance is defined between the axial front-tooth-center plane and the axial rear-tooth-center plane. The axial tooth distance is equal to or smaller than 22 mm in a state where the multiple rear sprocket assembly is rotatably supported around the hub axle. The hub axle comprises a first axial frame abutment surface and a second axial frame abutment surface. The first axial frame abutment surface is configured to abut against a first part of a bicycle frame in the axial direction in a state where the bicycle hub assembly is mounted to the bicycle frame. The second axial frame abutment surface is configured to abut against a second part of the bicycle frame in the axial direction in the state where the bicycle hub assembly is mounted to the bicycle frame. A hub axial distance is defined between the first axial frame abutment surface and the second axial frame abutment surface in the axial direction, the hub axial distance being larger than or equal to 146 mm.

With the bicycle drive train according to the twenty-third aspect, it is possible to reduce an inclination of the bicycle chain extending between the bicycle front sprocket and a rear low-gear sprocket relative to the axial bicycle-center plane. This can improve chain-driving performance of the bicycle front sprocket in the bicycle frame to which the hub axle having high lateral rigidity is attachable.

In accordance with a twenty-fourth aspect of the present invention, the bicycle drive train according to the twenty-third aspect is configured so that the bicycle front sprocket is a solitary front sprocket.

With the bicycle drive train according to the twenty-fourth aspect, it is possible to contribute saving of weight of the bicycle.

In accordance with a twenty-fifth aspect of the present invention, the bicycle drive train according to the twenty-third or twenty-fourth aspect is configured so that the axial tooth distance is equal to or larger than 17 mm.

With the bicycle drive train according to the twenty-fifth aspect, it is possible to reduce the inclination of the bicycle chain extending between the bicycle front sprocket and the rear low-gear sprocket relative to the axial bicycle-center plane. Furthermore, it is possible to reduce the inclination of the bicycle chain extending between the bicycle front sprocket and the rear top-gear sprocket relative to the axial bicycle-center plane.

In accordance with a twenty-sixth aspect of the present invention, the bicycle drive train according to the twenty-third or twenty-fourth aspect is configured so that the axial tooth distance is equal to or smaller than 19 mm.

With the bicycle drive train according to the twenty-sixth aspect, it is possible to reduce the inclination of the bicycle chain extending between the bicycle front sprocket and the rear low-gear sprocket relative to the axial bicycle-center plane. It is possible to reduce the inclination of the bicycle chain extending between the bicycle front sprocket and the rear top-gear sprocket relative to the axial bicycle-center plane. Furthermore, it is possible to reduce interference between the bicycle chain and the bicycle frame.

In accordance with a twenty-seventh aspect of the present invention, a bicycle front sprocket comprises a sprocket body and at least one sprocket tooth. The sprocket body includes a crank arm mounting portion to be mounted to a bicycle crank arm. The at least one sprocket tooth has an axial tooth-center plane defined to bisect a maximum axial width of the at least one sprocket tooth. An axial distance is defined from the axial tooth-center plane to an axial bicycle-center plane defined to bisect a bicycle frame in the axial direction. The axial distance is equal to or smaller than 48 mm in a state where the bicycle front sprocket is mounted to the bicycle frame.

With the bicycle front sprocket according to the twenty-seventh aspect, it is possible to reduce an inclination of the bicycle chain extending between the bicycle front sprocket and a rear low-gear sprocket relative to the axial bicycle-center plane. This can improve chain-driving performance of the bicycle front sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
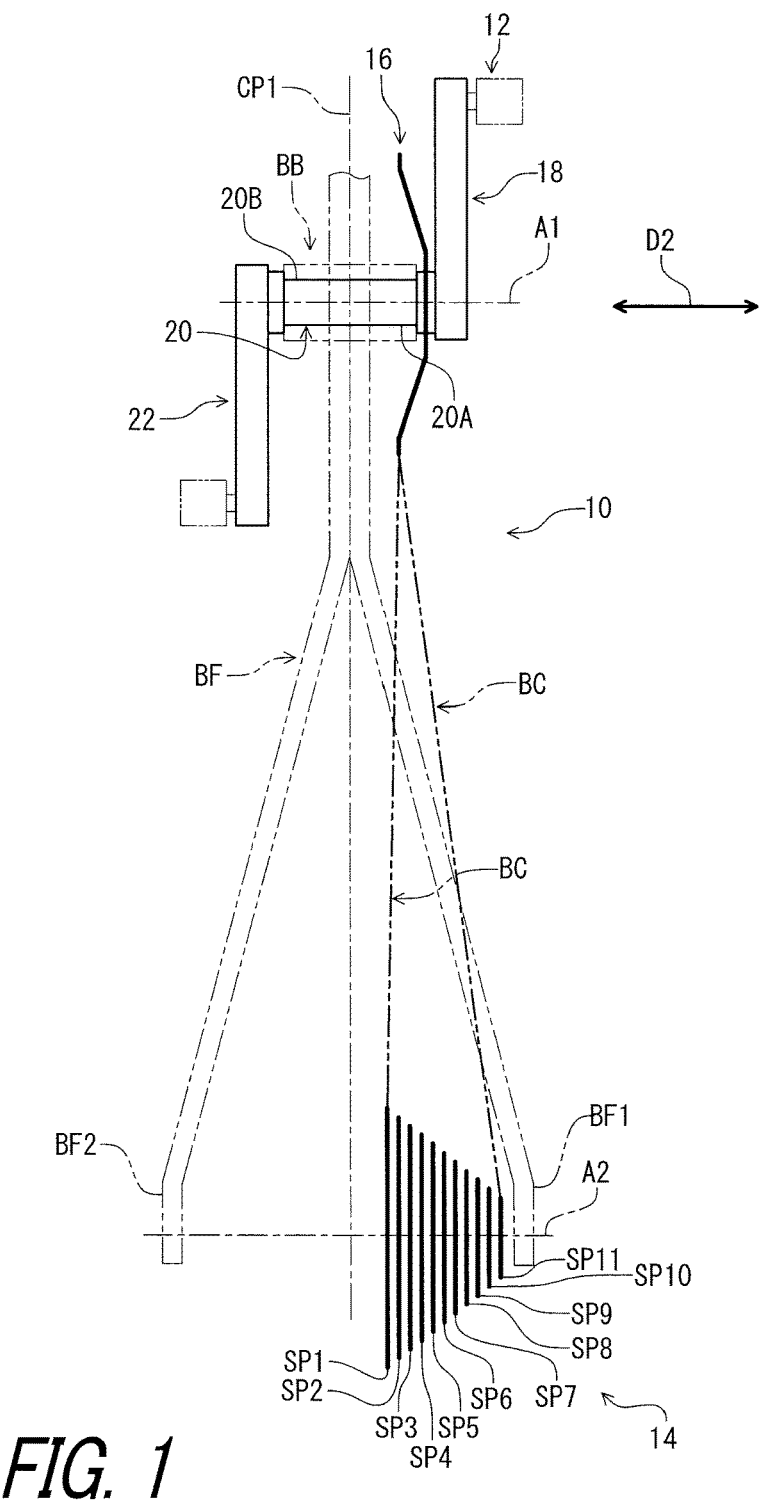
FIG. 1 is a schematic diagram of a bicycle drive train in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 in accordance with an embodiment comprises a bicycle crank assembly 12 and a multiple rear sprocket assembly 14. The bicycle crank assembly 12 comprises a bicycle front sprocket 16 and a bicycle crank arm 18. In this embodiment, the bicycle front sprocket 16 is a solitary front sprocket in the bicycle crank assembly 12. The multiple rear sprocket assembly 14 includes a plurality of bicycle rear sprockets. The plurality of bicycle rear sprockets includes eleven rear sprockets SP1 to SP11. The bicycle rear sprocket SP1 can also be referred to as a largest rear sprocket SP1. The bicycle rear sprocket SP11 can also be referred to as a smallest rear sprocket SP11. Namely, the multiple rear sprocket assembly 14 comprises the largest rear sprocket SP1 and the smallest rear sprocket SP11. The largest rear sprocket SP1 corresponds to a low-gear sprocket and has a largest outer diameter in the multiple rear sprocket assembly 14. The smallest rear sprocket SP11 corresponds to a top-gear sprocket and has a smallest outer diameter in the multiple rear sprocket assembly 14.

Figure 15:
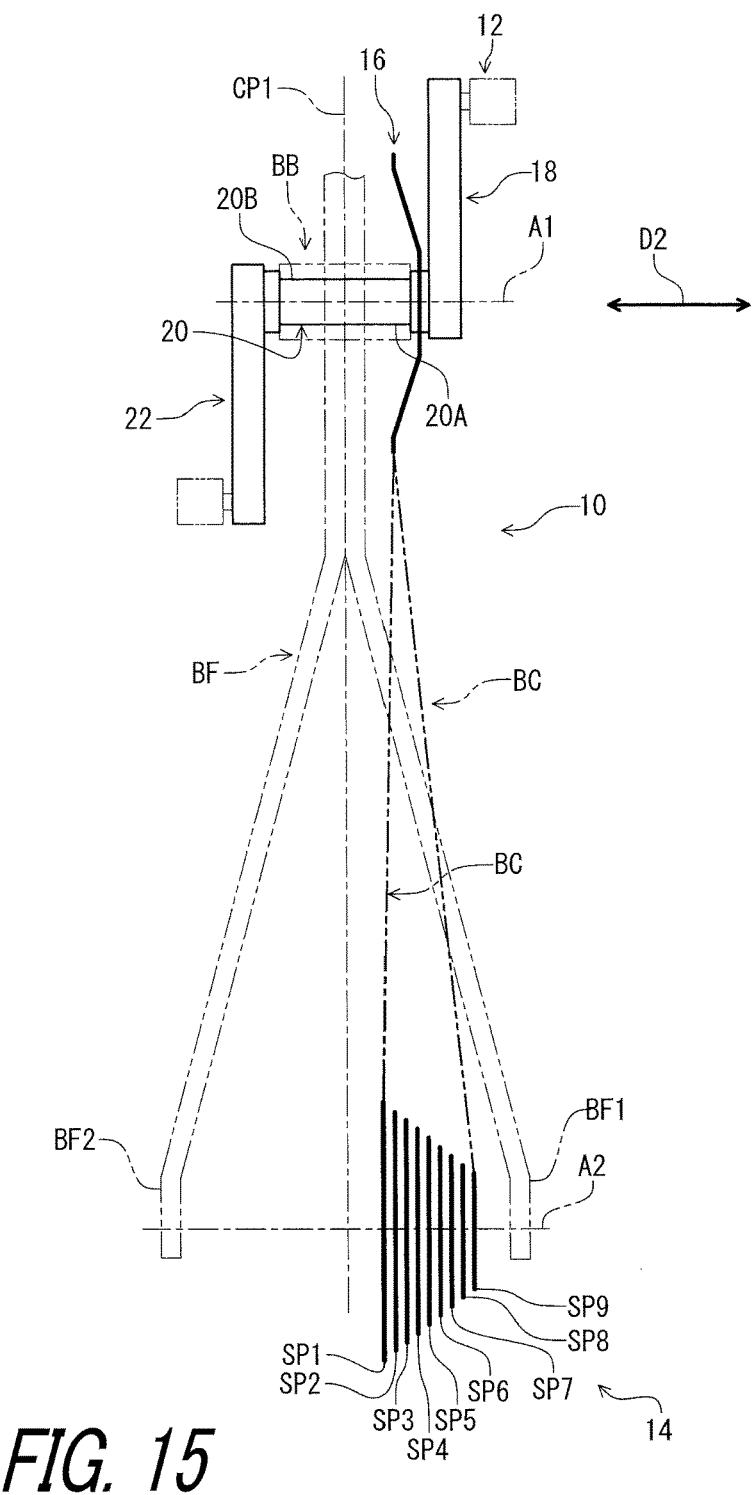
FIG. 15 is a schematic diagram of a bicycle drive train in accordance with a modification.
Figure 16:
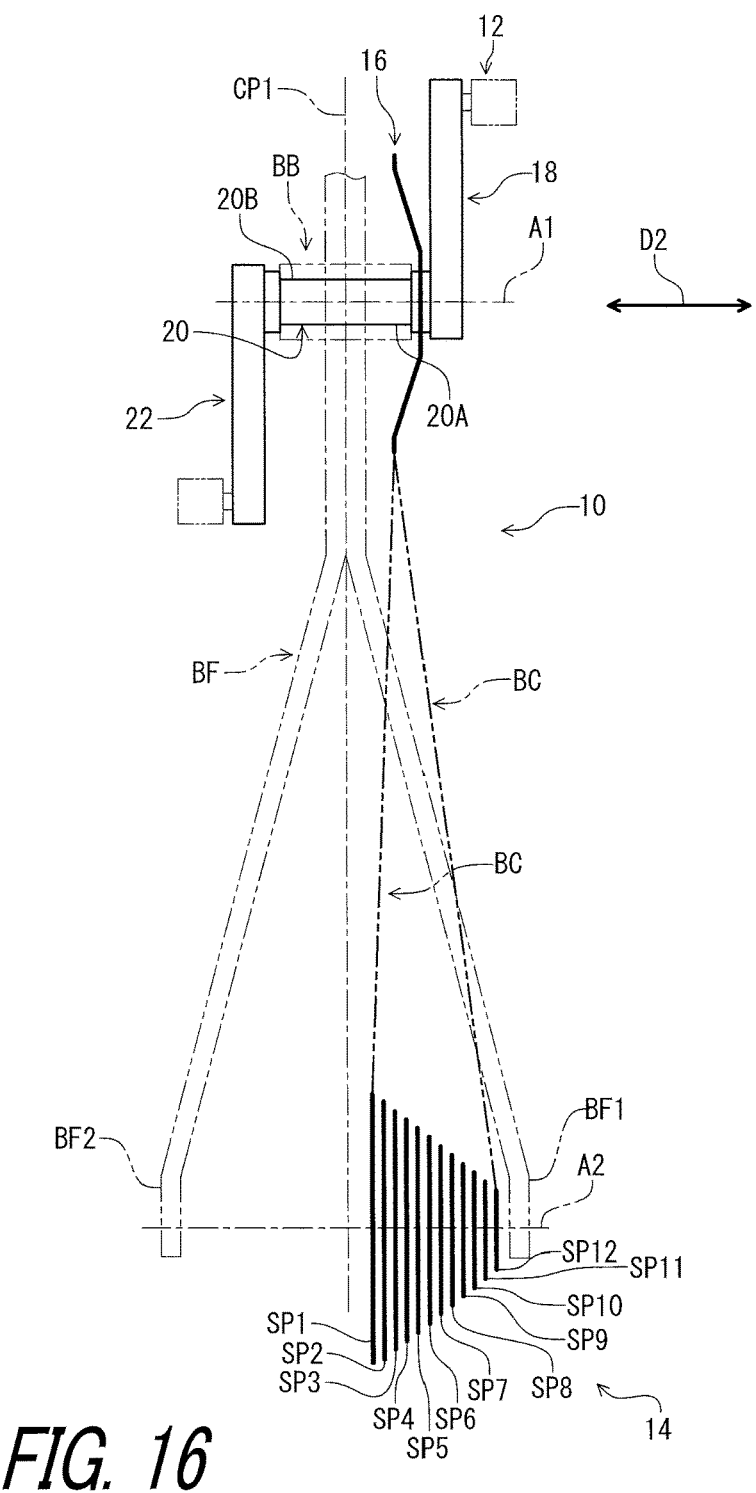
FIG. 16 is a schematic diagram of a bicycle drive train in accordance with another modification.

A total number of each of the bicycle front sprocket 16 and the plurality of rear sprockets is not limited to this embodiment. As seen in FIG. 15, for example, the plurality of bicycle rear sprockets can include nine rear sprockets SP1 to SP9. In a modification illustrated in FIG. 15, the bicycle rear sprocket SP9 can also be referred to as a smallest rear sprocket SP9. Furthermore, as seen in FIG. 16, the plurality of the bicycle rear sprockets can include twelve rear sprockets SP1 to SP12. In a modification illustrated in FIG. 16, the bicycle rear sprocket SP12 can also be referred to as a smallest rear sprocket SP12.

The bicycle crank assembly 12 and the bicycle front sprocket 16 have a rotational center axis A1. The bicycle crank assembly 12 is rotatable about the rotational center axis A1 relative to a bicycle frame BF. The bicycle crank assembly 12 is rotatably coupled to the bicycle frame BF by a bicycle bottom bracket assembly BB secured to the bicycle frame BF. The multiple rear sprocket assembly 14 has a rotational center axis A2. The multiple rear sprocket assembly 14 is rotatable about the rotational center axis A2 relative to the bicycle frame BF. A bicycle chain BC extends between the bicycle front sprocket 16 and the multiple rear sprocket assembly 14. The bicycle front sprocket 16 and the multiple rear sprocket assembly 14 are engaged with the bicycle chain BC to transmit a driving rotational force from the bicycle front sprocket 16 to the multiple rear sprocket assembly 14 via the bicycle chain BC.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle crank assembly 12 and the bicycle front sprocket 16, should be interpreted relative to the bicycle equipped with the bicycle drive train 10 as used in an upright riding position on a horizontal surface.

Figure 2:
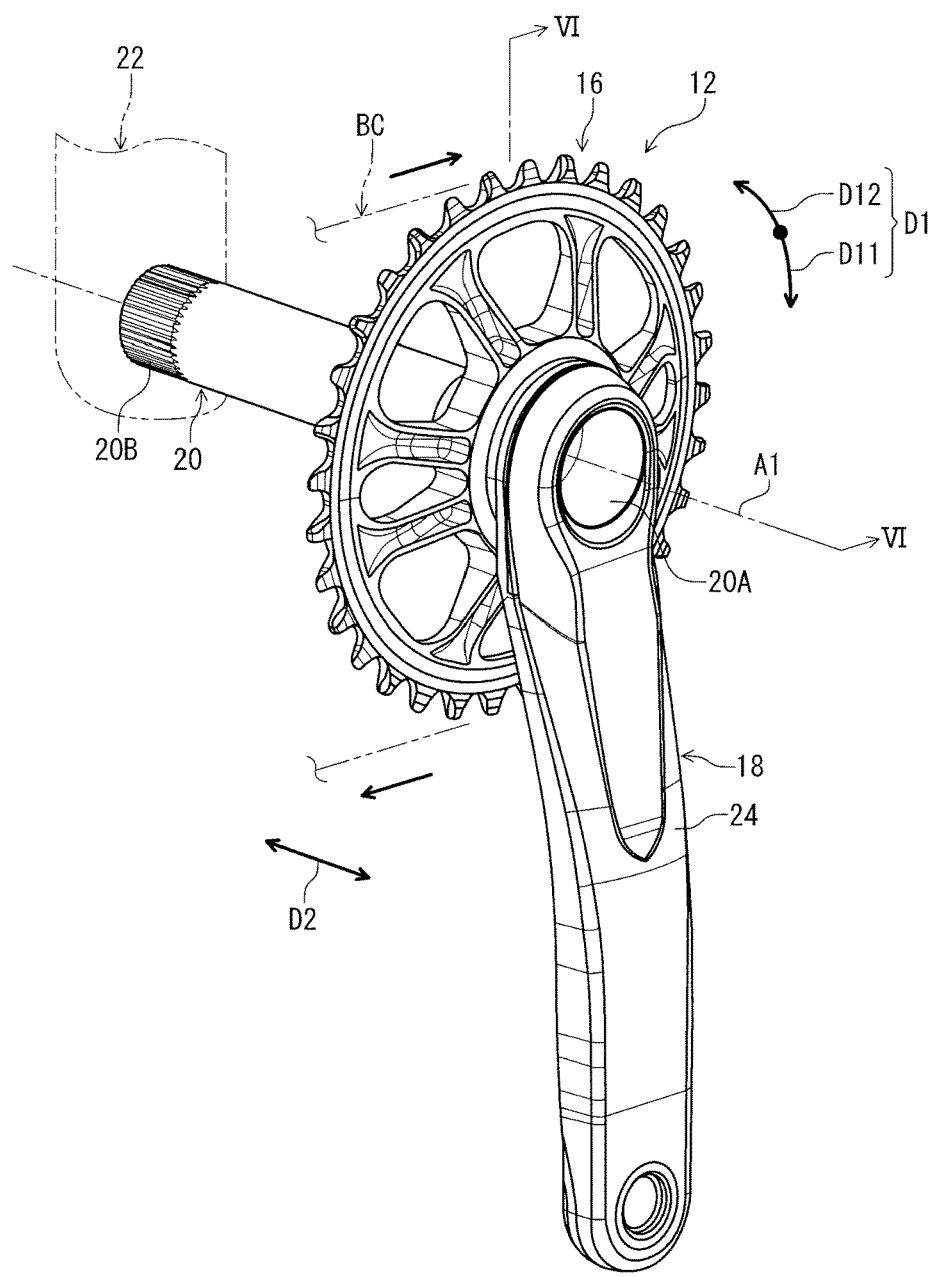
FIG. 2 is a perspective view of a bicycle crank assembly of the bicycle drive train illustrated in FIG. 1.
Figure 3:
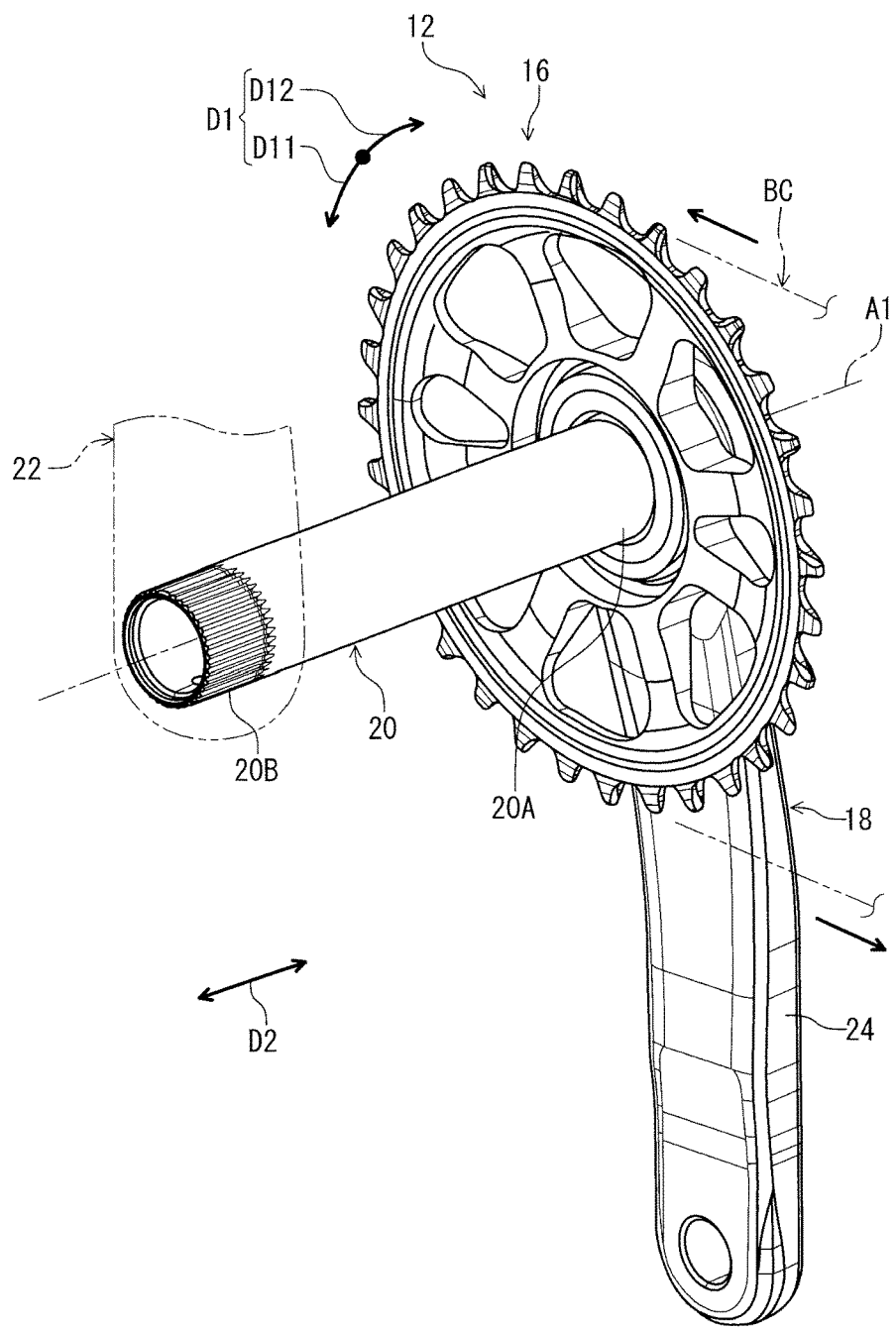
FIG. 3 is another perspective view of the bicycle crank assembly of the bicycle drive train illustrated in FIG. 1.

As seen in FIGS. 2 and 3, the bicycle front sprocket 16 is rotatable about the rotational center axis A1 in a driving rotational direction D11 during pedaling. The driving rotational direction D11 is defined along a circumferential direction D1 defined about the rotational center axis A1. A reversing rotational direction D12 is a reverse direction of the driving rotational direction D11 and is defined along the circumferential direction D1.

The bicycle crank assembly 12 comprises a crank axle 20 and an additional bicycle crank arm 22. The crank axle 20 includes a first axle end 20A and a second axle end 20B and extends between the first axle end 20A and the second axle end 20B along the rotational center axis A1. The bicycle crank arm 18 is secured to the first axle end 20A. The additional bicycle crank arm 22 is secured to the second axle end 20B. The bicycle crank arm 18 is closer to the bicycle front sprocket 16 than the additional bicycle crank arm 22 in an axial direction D2 parallel to the rotational center axis A1. In this embodiment, the bicycle crank arm 18 is a right crank arm, and the additional bicycle crank arm 22 is a left crank arm. The bicycle crank arm 18 comprises an arm body 24. The arm body 24 is secured to the first axle end 20A and extends radially outwardly from the first axle end 20A.

Figure 4:
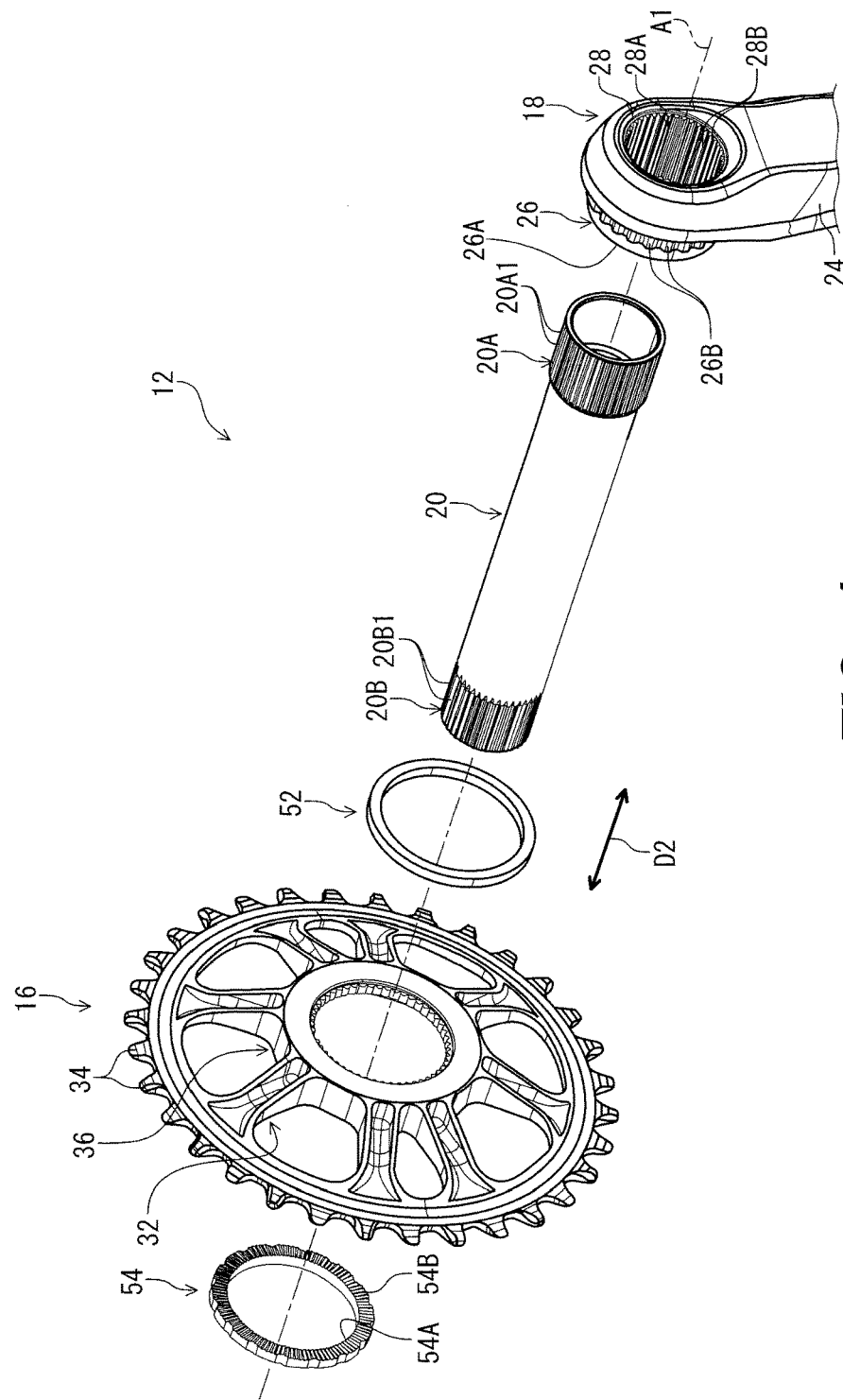
FIG. 4 is an exploded perspective view of the bicycle crank assembly of the bicycle drive train illustrated in FIG. 1, with one of crank arms omitted.
Figure 5:
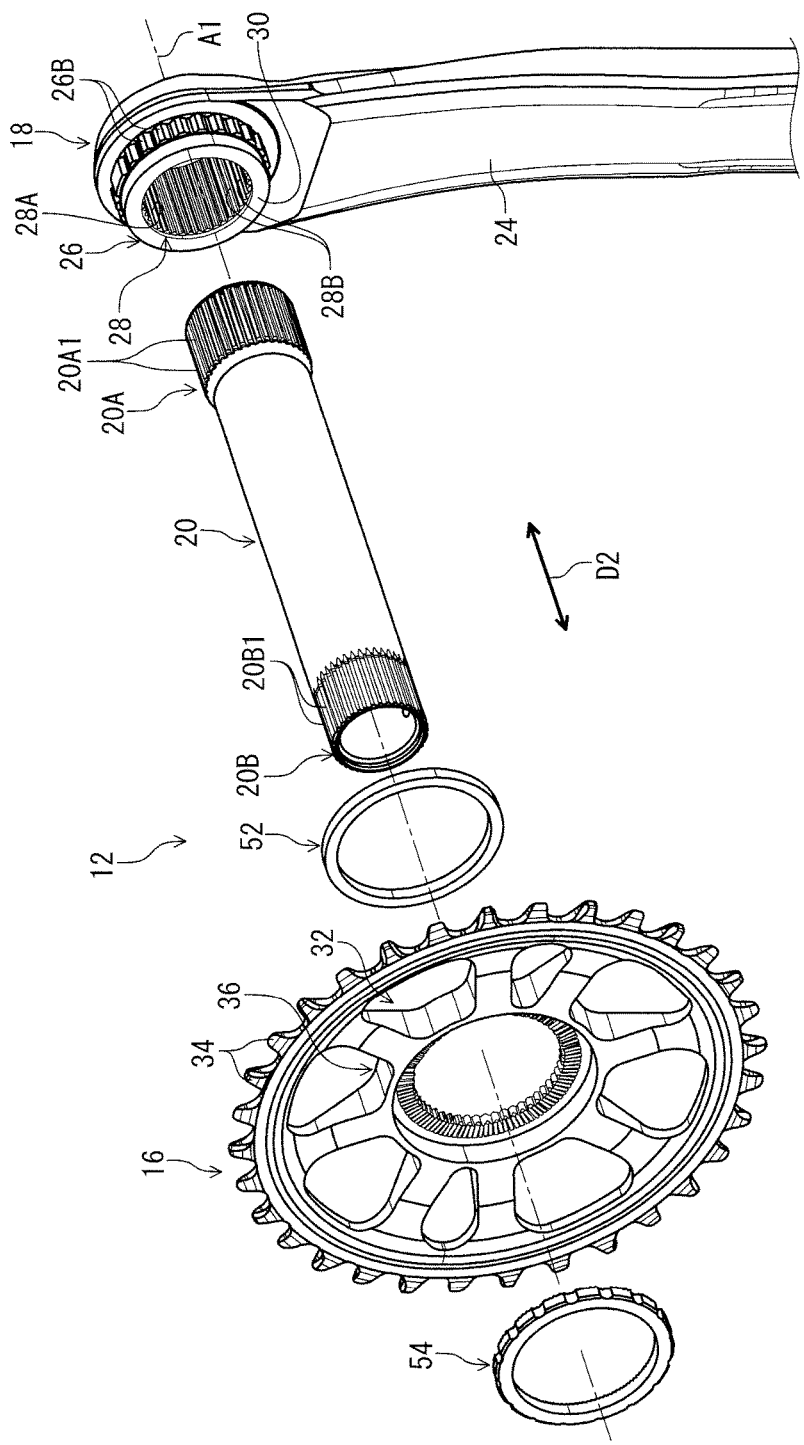
FIG. 5 is another exploded perspective view of the bicycle crank assembly of the bicycle drive train illustrated in FIG. 1, with one of crank arms omitted.
Figure 6:
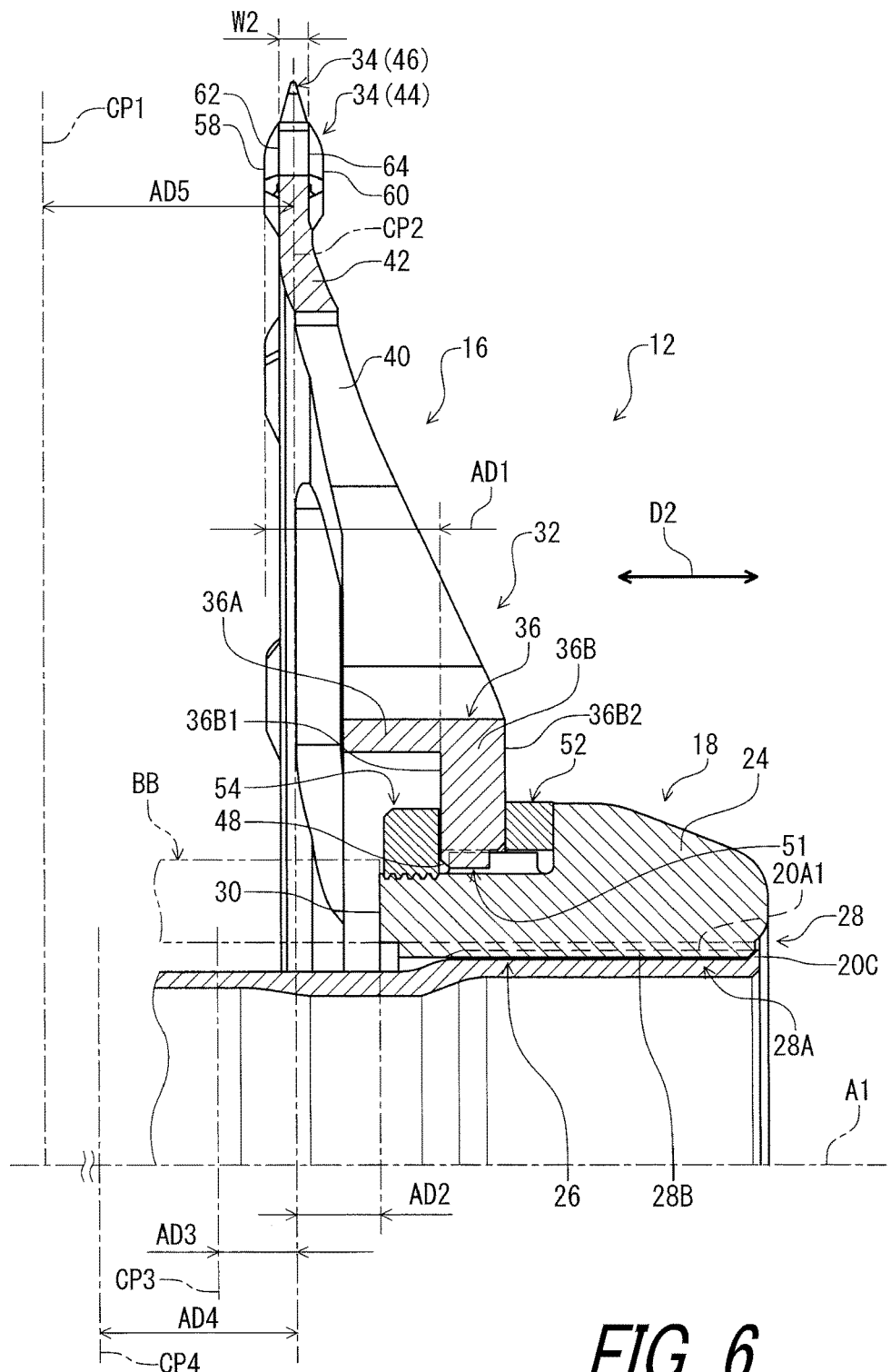
FIG. 6 is a cross-sectional view of the bicycle crank assembly taken along line VI-VI of FIG. 2.

As seen in FIGS. 4 and 5, the bicycle crank arm 18 comprises a mounting boss 26 and an axle-attachment part 28. The mounting boss 26 extends from the arm body 24 in the axial direction D2. The bicycle front sprocket 16 is mounted on the mounting boss 26. The axle-attachment part 28 is provided in the arm body 24 and the mounting boss 26. The first axle end 20A is coupled to the axle-attachment part 28. The axle-attachment part 28 includes an axle-attachment hole 28A through which the first axle end 20A extends. The axle-attachment part 28 includes a plurality of attachment teeth 28B defining the axle-attachment hole 28A. The first axle end 20A includes a plurality of first receiving teeth 20A1 meshing with the plurality of attachment teeth 28B. Each of the first receiving teeth 20A1 and the attachment teeth 28B forms splines to engage with each other. As seen in FIG. 6, the arm body 24 is positioned relative to the first axle end 20A with a stopper 20C. As seen in FIG. 5, the second axle end 20B includes a plurality of second receiving teeth 20B1. The additional bicycle crank arm 22 (FIG. 3) is detachably secured to the second axle end 20B with the plurality of second receiving teeth 20B1 and a fastener (not shown).

The term "detachably secured" or "detachably securing", as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably attached", "detachably joined", "detachably connected", "detachably coupled", "detachably mounted", "detachably bonded", "detachably fixed" and their derivatives.

As seen in FIG. 6, the bicycle crank arm 18 comprises an abutment surface 30. The abutment surface 30 faces toward the bicycle bottom bracket assembly BB in the axial direction D2 parallel to the rotational center axis A1 of the bicycle front sprocket 16 to abut against the bicycle bottom bracket assembly BB. The abutment surface 30 is provided at an axial end of the mounting boss 26. Specifically the abutment surface 30 comprises axially inner surface of the mounting boss 26. In this embodiment, the abutment surface 30 is in contact with the bicycle bottom bracket assembly BB in a state where the bicycle crank assembly 12 is mounted to the bicycle frame BF (FIG. 1) via the bicycle bottom bracket assembly BB. However, a clearance and/or another member can be provided between the abutment surface 30 and the bicycle bottom bracket assembly BB in the state where the bicycle crank assembly 12 is mounted to the bicycle frame BF (FIG. 1) via the bicycle bottom bracket assembly BB.

As seen in FIG. 5, the bicycle front sprocket 16 comprises a sprocket body 32 and at least one sprocket tooth 34. The sprocket body 32 includes a crank arm mounting portion 36 to be mounted to the bicycle crank arm 18. In this embodiment, the crank arm mounting portion 36 has an annular shape. The at least one sprocket tooth 34 includes a plurality of sprocket teeth 34. The sprocket teeth 34 extend radially outwardly from the sprocket body 32 and are arranged in the circumferential direction D1 to engage with the bicycle chain BC. A total number of the plurality of sprocket teeth 34 is not limited to this embodiment. The sprocket body 32 can also be referred to as a front sprocket body 32. The at least one sprocket tooth 34 can also be referred to as at least one front sprocket tooth 34.

Figure 7:
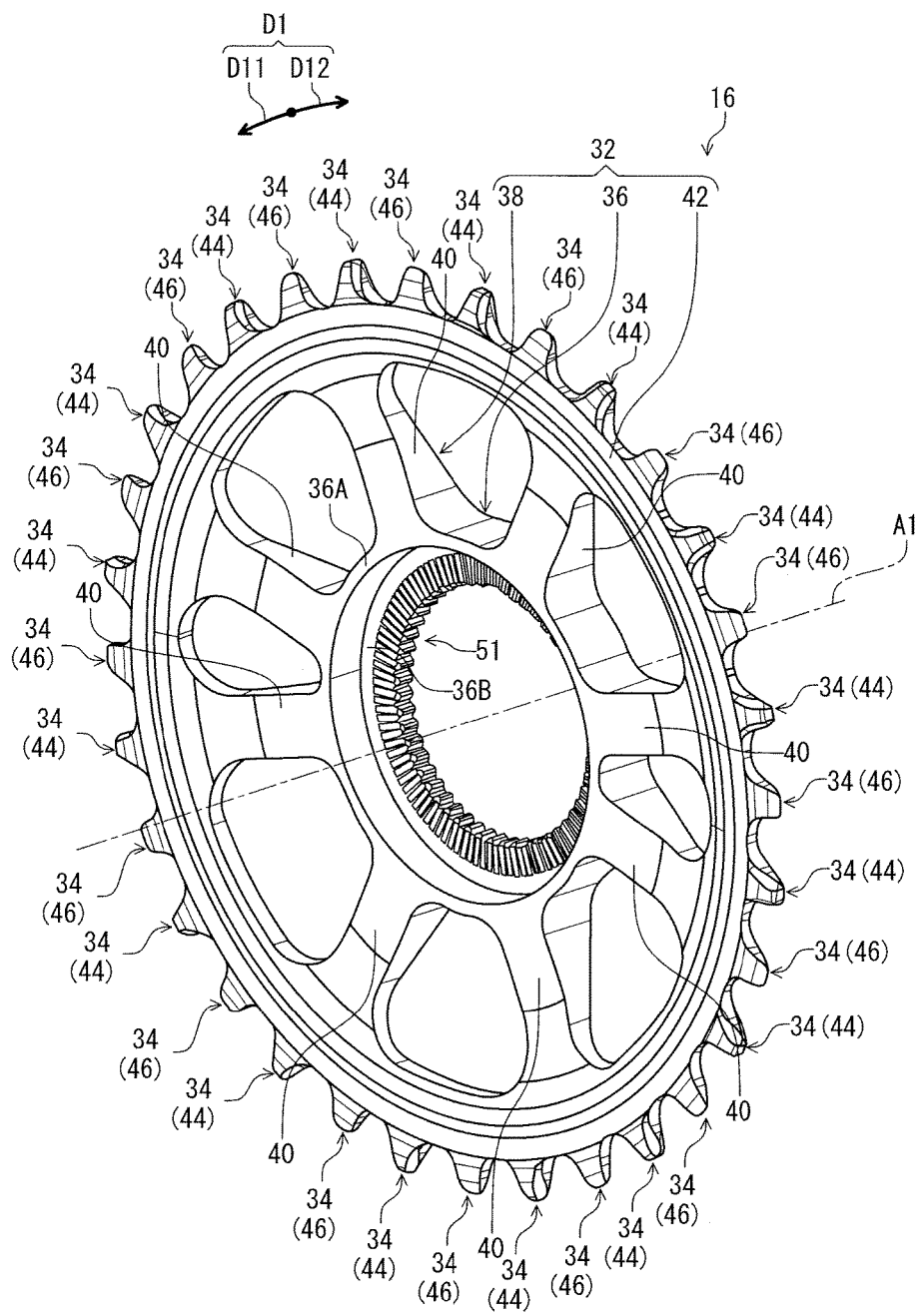
FIG. 7 is a perspective view of a bicycle front sprocket of the bicycle crank assembly.

As seen in FIG. 7, the sprocket body 32 includes a radially extending portion 38 extending from the crank arm mounting portion 36 toward an outer periphery of the sprocket body 32 in a radial direction perpendicular to the rotational center axis A1. The radially extending portion 38 includes at least four radially extending arms 40. In this embodiment, a total number of the radially extending arms 40 is eight. However, the total number of the radially extending arms 40 is not limited to this embodiment.

The radially extending arms 40 are spaced apart from each other in the circumferential direction D1 defined about the rotational center axis A1. In this embodiment, the sprocket body 32 includes an outer ring 42 provided radially outward of the crank arm mounting portion 36. The sprocket teeth 34 extend radially outwardly from the outer ring 42. The radially extending arms 40 radially extend between the outer ring 42 and the crank arm mounting portion 36 to couple the outer ring 42 to the crank arm mounting portion 36. However, the shape of the radially extending portion 38 is not limited to this embodiment. The shape of the bicycle front sprocket 16 is not limited to this embodiment.

The at least one sprocket tooth 34 includes at least one first tooth 44 and at least one second tooth 46. The plurality of sprocket teeth 34 includes first teeth 44 and second teeth 46. The first teeth 44 and the second teeth 46 are alternatingly arranged in the circumferential direction D1. A total number of the first teeth 44 is equal to a total number of the second teeth 46. However, the total number of the first teeth 44 is not limited to this embodiment. The total number of the second teeth 46 is not limited to this embodiment.

Figure 8:
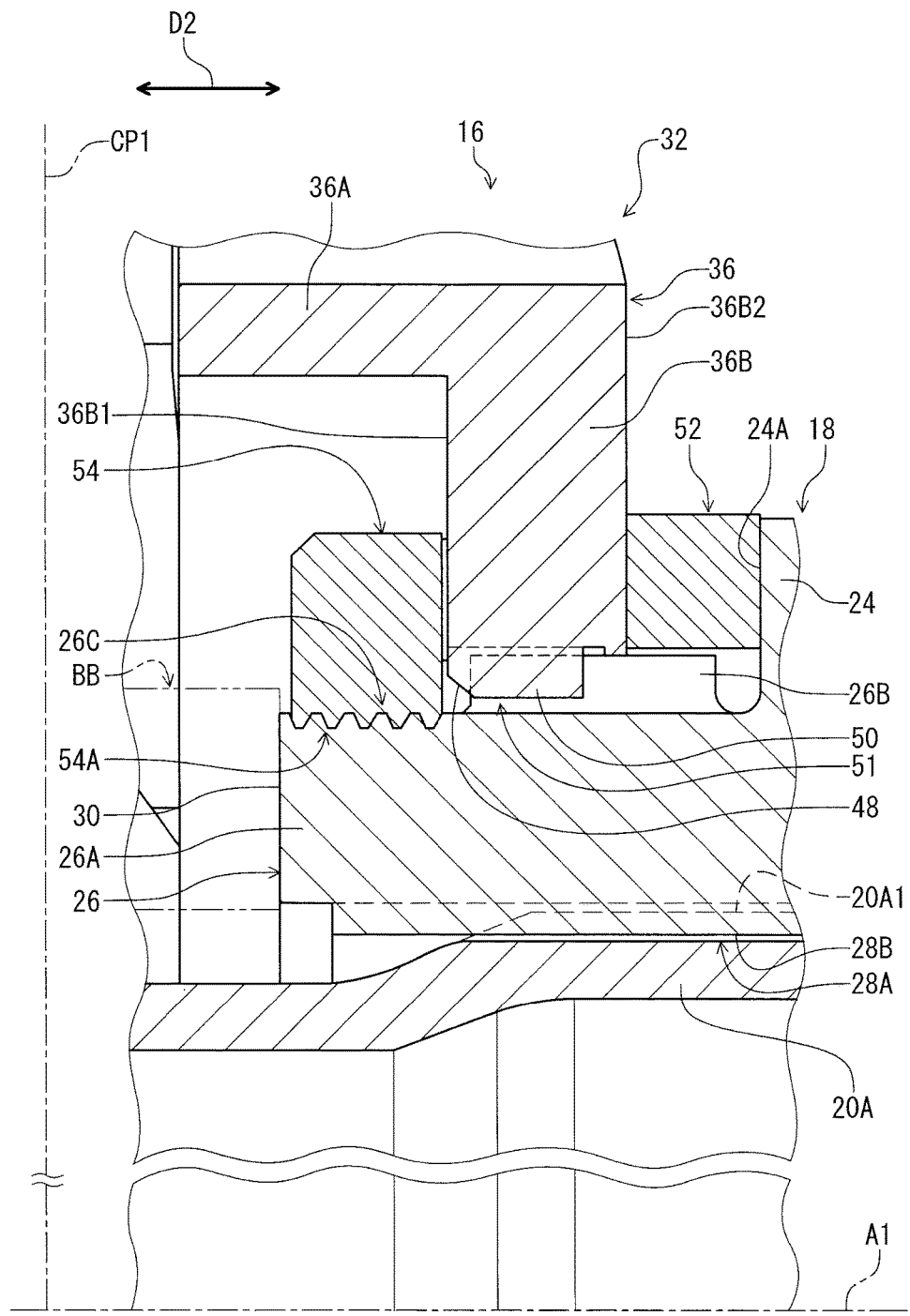
FIG. 8 is a partial enlarged cross-sectional view of the bicycle crank assembly.

As seen in FIG. 8, the crank arm mounting portion 36 includes a first mounting axial surface 48 facing toward an axial bicycle-center plane CP1 in the axial direction D2 parallel to the rotational center axis A1 of the bicycle front sprocket 16 in a state where the bicycle front sprocket 16 is mounted to the bicycle frame BF (FIG. 1). The axial bicycle-center plane CP1 is defined to bisect the bicycle frame BF in the axial direction D2. The axial bicycle-center plane CP1 is perpendicular to the rotational center axis A1.

Figure 9:
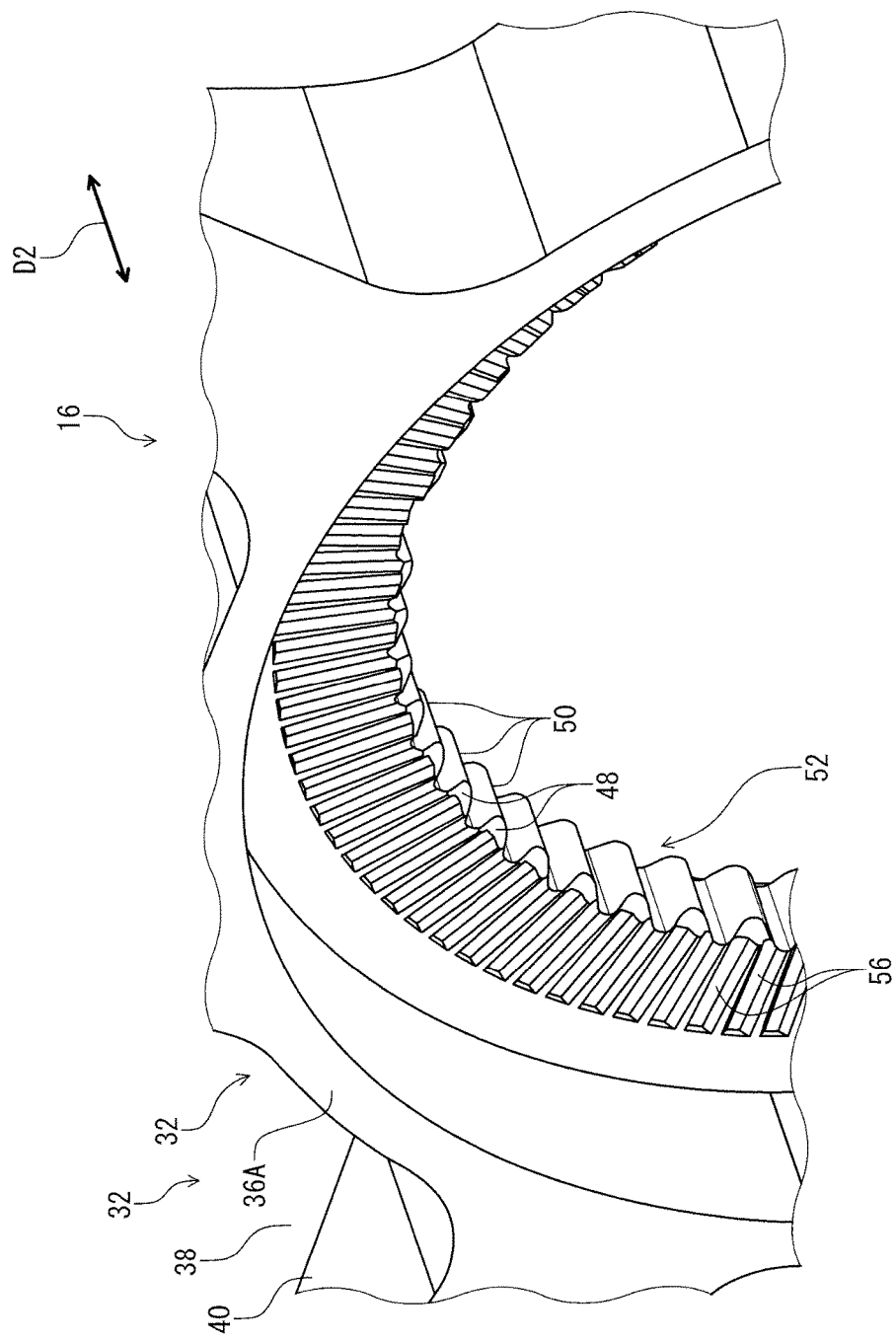
FIG. 9 is a partial enlarged perspective view of the bicycle front sprocket.

As seen in FIGS. 8 and 9, the crank arm mounting portion 36 includes a plurality of mounting teeth 50 configured to engage with the mounting boss 26 of the bicycle crank arm 18 in the state where the bicycle front sprocket 16 is mounted to the bicycle crank arm 18. In this embodiment, the first mounting axial surface 48 is provided on an axial end of the mounting tooth 50. The first mounting axial surface 48 is inclined relative to the rotational center axis A1. The first mounting axial surface 48 can be perpendicular to the rotational center axis A1. The first mounting axial surface 48 can coincide with a first axial surface 36B1 (described later). The plurality of mounting teeth 50 defines a mounting opening 51 through which the mounting boss 26 extends. However, the structure of the crank arm mounting portion 36 is not limited to this embodiment. The crank arm mounting portion 36 can include another structure other than the plurality of mounting teeth 50.

As seen in FIGS. 4, 5, and 8, the mounting boss 26 includes a cylindrical part 26A and a plurality of receiving teeth 26B. The receiving teeth 26B are provided on an outer periphery of the cylindrical part 26A to engage with the mounting teeth 50. The receiving teeth 26B are arranged in the circumferential direction D1. Each of the receiving teeth 26B and the mounting teeth 50 forms splines to engage with each other.

As seen in FIG. 7, the crank arm mounting portion 36 includes an annular support 36A and a flange part 36B. The radially extending portion 38 (the radially extending arms 40) extends radially outwardly from the annular support 36A. The flange part 36B has an annular shape and extends radially inwardly from the annular support 36A.

As seen in FIG. 9, the plurality of mounting teeth 50 is provided on an inner periphery of the flange part 36B. As seen in FIG. 8, the flange part 36B includes a first axial surface 36B1 and a second axial surface 36B2. The first axial surface 36B1 faces in the axial direction D2. The second axial surface 36B2 faces in the axial direction D2. The second axial surface 36B2 is provided on a reverse side of the first axial surface 36B1 in the axial direction D2. The first axial surface 36B1 is closer to the axial bicycle-center plane CP1 than the second axial surface 36B2 in the state where the bicycle front sprocket is mounted to the bicycle frame BF.

As seen in FIGS. 5 and 6, the bicycle crank assembly 12 includes a spacer 52 and a lock member 54. The spacer 52 has an annular shape and is provided between the arm body 24 and the crank arm mounting portion 36 in the axial direction D2. The spacer 52 is provided radially outward of the mounting boss 26 of the bicycle crank arm 18. The lock member 54 has an annular shape. The lock member 54 is attached to the mounting boss 26 to secure the bicycle front sprocket 16 to the bicycle crank arm 18 in the axial direction D2.

As seen in FIG. 8, the crank arm mounting portion 36 and the spacer 52 are provided between the lock member 54 and the arm body 24 in the axial direction D2. The lock member 54 is provided radially outward of the mounting boss 26. The lock member 54 includes a threaded hole 54A. The mounting boss 26 includes an externally threaded portion 26C threadedly engaged with the threaded hole of the lock member 54. The arm body 24 includes a receiving surface 24A. The crank arm mounting portion 36 and the spacer 52 are held between the lock member 54 and the receiving surface 24A in the axial direction D2 by tightening the lock member 54. Axial positions of the spacer 52 and the bicycle front sprocket 16 can be switched in the axial direction D2. It is possible to adjust the axial position of the bicycle front sprocket 16 relative to the bicycle crank arm 18 by switching of the axial positions of the spacer 52 and the bicycle front sprocket 16. Thus, it is possible to adjust a chain line of the bicycle chain BC defined by the sprocket teeth 34 of the bicycle front sprocket 16. The spacer 52 (or other chain-line adjustment structures) can be omitted from the bicycle crank assembly 12.

As seen in FIG. 4, the lock member 54 includes a plurality of lock teeth 54B. The plurality of lock teeth 54B radially extends and is arranged in the circumferential direction D1. The lock teeth 54B form knurling. As seen in FIG. 9, the crank arm mounting portion 36 includes a plurality of lock grooves 56 provided on the first axial surface 36B1. The plurality of lock grooves 56 forms knurling. The plurality of lock grooves 56 extend radially outwardly from the plurality of mounting teeth 50 and is arranged in the circumferential direction D1. The plurality of lock teeth 54B meshes with the plurality of lock grooves 56 to increase a friction force occurring between the lock member 54 and the crank arm mounting portion 36 in the circumferential direction D1.

As seen in FIG. 6, the at least one sprocket tooth 34 has a first chain-engagement axial surface 58 facing toward the axial bicycle-center plane CP1 in the axial direction D2 in the state where the bicycle front sprocket 16 is mounted to the bicycle frame BF. In this embodiment, the at least one first tooth 44 has the first chain-engagement axial surface 58. Specifically, each of the first teeth 44 has the first chain-engagement axial surface 58. However, the first chain-engagement axial surface 58 can be provided at another position other than the at least one first tooth 44.

Figure 10:
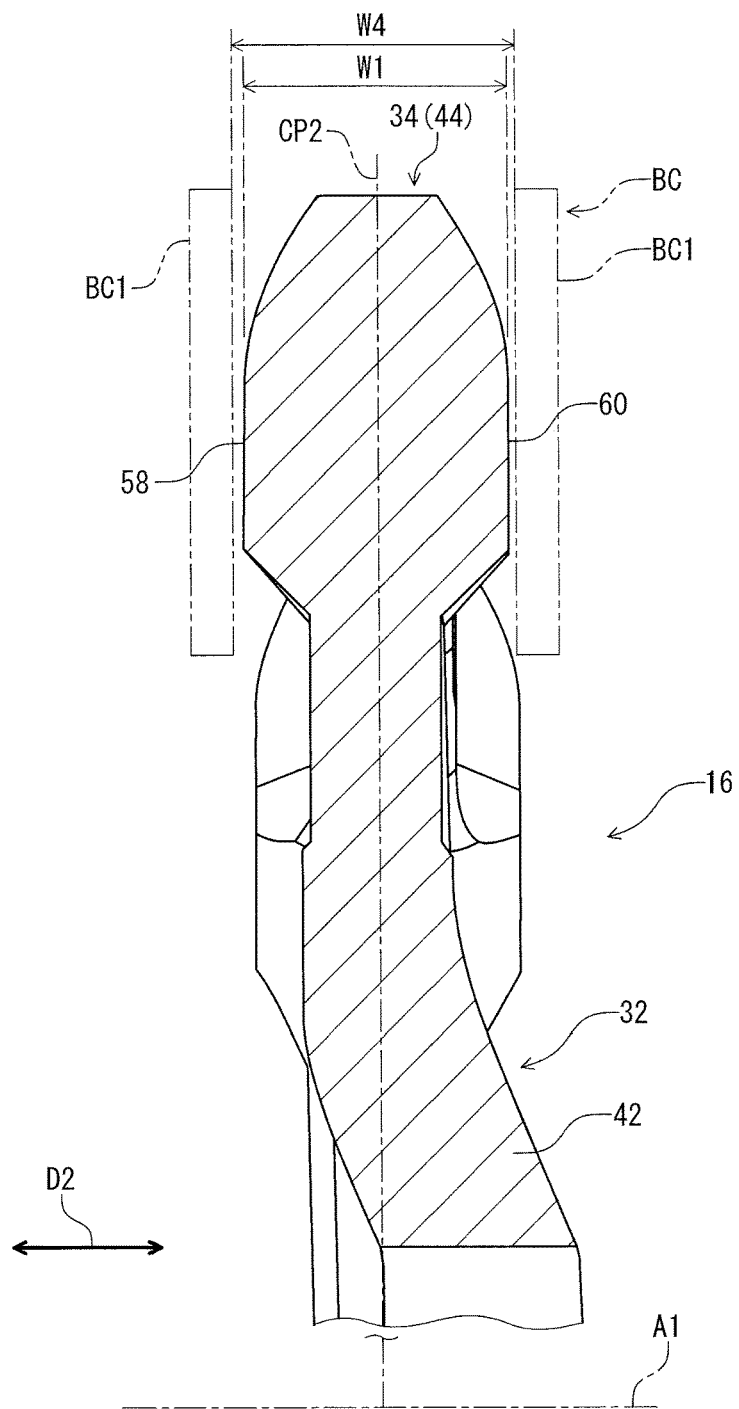
FIG. 10 is a partial cross-sectional view of the bicycle front sprocket.

As seen in FIG. 10, the at least one first tooth 44 has a first chain engaging width W1 defined in the axial direction D2. In this embodiment, each of the first teeth 44 has the first chain engaging width W1. The first tooth 44 includes a first additional chain-engagement axial surface 60 provided on a reverse side of the first chain-engagement axial surface 58 in the axial direction D2. The first chain-engagement axial surface 58 is contactable with one of an opposed pair of outer link plates BC1 of the bicycle chain BC. The first additional chain-engagement axial surface 60 is contactable with the other of the opposed pair of outer link plates BC1. The first chain engaging width W1 is defined between the first chain-engagement axial surface 58 and the first additional chain-engagement axial surface 60 in the axial direction D2.

Figure 11:
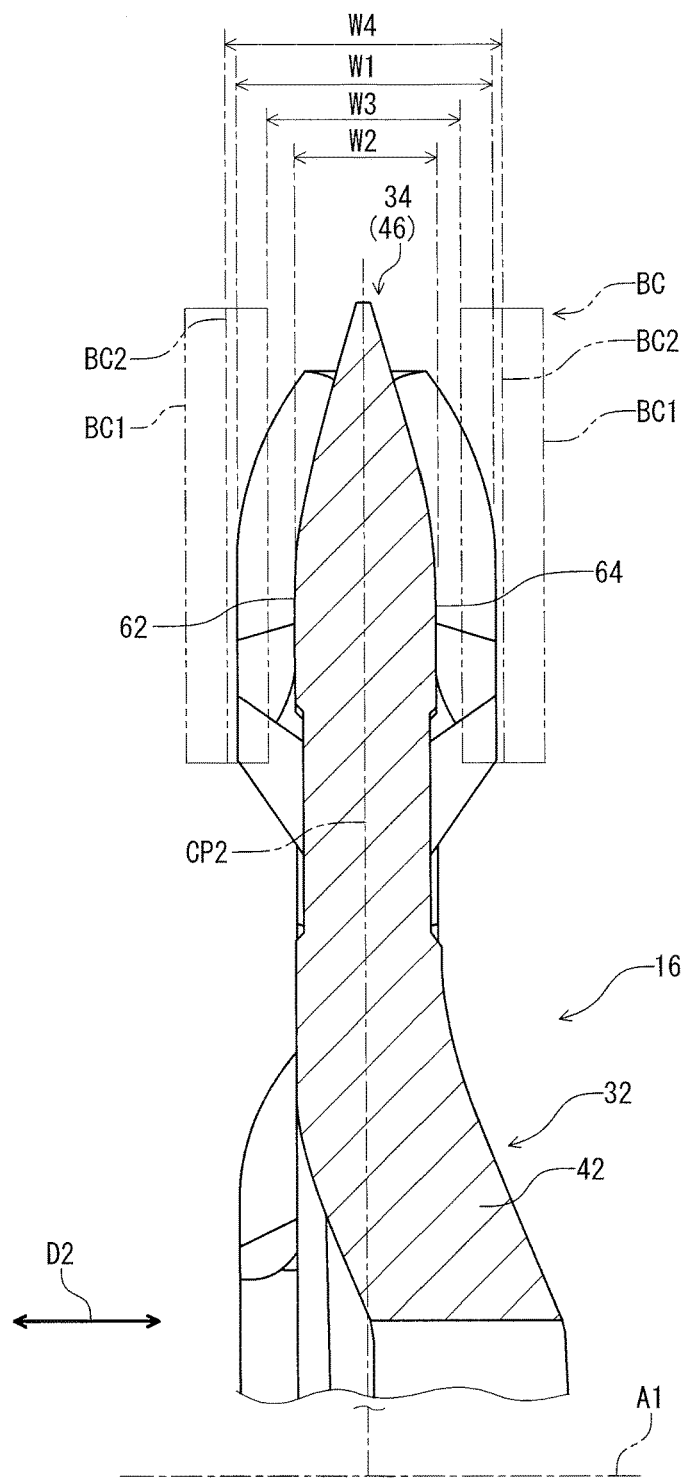
FIG. 11 is another partial cross-sectional view of the bicycle front sprocket.

As seen in FIG. 11, the at least one second tooth 46 has a second chain engaging width W2 defined in the axial direction D2. In this embodiment, each of the second teeth 46 has the second chain engaging width W2. The second tooth 46 includes a second chain-engagement axial surface 62 and a second additional chain-engagement axial surface 64. The second additional chain-engagement axial surface 64 is provided on a reverse side of the second chain-engagement axial surface 62 in the axial direction D2. The second chain-engagement axial surface 62 is contactable with one of an opposed pair of inner link plates BC2 of the bicycle chain BC. The second additional chain-engagement axial surface 64 is contactable with the other of the opposed pair of inner link plates BC2. The second chain engaging width W2 is defined between the second chain-engagement axial surface 62 and the second additional chain-engagement axial surface 64 in the axial direction D2.

As seen in FIG. 11, the second chain engaging width W2 is smaller than the first chain engaging width W1. However, the second chain engaging width W2 can be equal to or larger than the first chain engaging width W1. The first chain engaging width W1 is larger than an inner link space W3 defined between the opposed pair of inner link plates BC2 of the bicycle chain BC and is smaller than an outer link space W4 defined between the opposed pair of outer link plates BC1 of the bicycle chain BC. The second chain engaging width W2 is smaller than the inner link space W3. However, the first chain engaging width W1 can be equal to or smaller than the inner link space W3.

As seen in FIG. 6, the first chain-engagement axial surface 58 is offset from the first mounting axial surface 48 toward the axial bicycle-center plane CP1 in the axial direction D2, in the state where the bicycle front sprocket 16 is mounted to the bicycle frame BF. An axial distance AD1 is defined from the first mounting axial surface 48 to the first chain-engagement axial surface 58 in the axial direction D2. In this embodiment, the first mounting axial surface 48 is inclined relative to the rotational center axis A1. Thus, the axial distance AD1 is a minimum axial distance defined from the first mounting axial surface 48 to the first chain-engagement axial surface 58 in the axial direction D2. The axial distance AD1 can be defined from the first axial surface 36B1 of the flange part 36B to the first chain-engagement axial surface 58 in the axial direction D2.

The axial distance AD1 is equal to or larger than 6 mm. The axial distance AD1 is equal to or larger than approximately 6 mm. The axial distance AD1 is equal to or smaller than 22.5 mm. However, the axial distance AD1 can be equal to or smaller than approximately 22.5 mm. Preferably, the axial distance AD1 is equal to or smaller than 11 mm. However, the axial distance AD1 can be equal to or smaller than approximately 11 mm. The axial distance AD1 can be larger than 11 mm. More preferably, the axial distance AD1 is equal to or smaller than 9.5 mm and is equal to or larger than 8 mm. In this embodiment, the axial distance AD1 is 8.9 mm. However, the axial distance AD1 can be equal to or smaller than approximately 9.5 mm and can be equal to or larger than approximately 8 mm. The axial distance AD1 can be larger than 9.5 mm and can be smaller than 8 mm.

In this embodiment, the axial distance AD1 is equal to or larger than three times of the second chain engaging width W2. However, the axial distance AD1 can be equal to or larger than approximately three times of the second chain engaging width W2. The axial distance AD1 can be smaller than three times of the second chain engaging width W2.

As seen in FIGS. 10 and 11, the at least one sprocket tooth 34 has an axial tooth-center plane CP2 defined to bisect a maximum axial width of the at least one sprocket tooth 34. In this embodiment, the plurality of sprocket teeth 34 has the axial tooth-center plane CP2 defined to bisect the maximum axial width of the plurality of sprocket teeth 34. The first chain engaging width W1 is the maximum axial width. Thus, as seen in FIG. 10, the first teeth 44 have the axial tooth-center plane CP2 defined to bisect the first chain engaging width of the first teeth 44. Similarly, as seen in FIG. 11, the axial tooth-center plane CP2 is defined to bisect the second chain engaging width W2 of the second teeth 46.

The axial tooth-center plane CP2 can also be referred to as an axial front-tooth-center plane CP2. Thus, the at least one front sprocket tooth 34 has the axial front-tooth-center plane CP2 defined to bisect a maximum axial width of the at least one front sprocket tooth 34.

As seen in FIG. 6, the axial tooth-center plane CP2 is positioned farther from the arm body 24 than the abutment surface 30 in the axial direction D2 parallel to the rotational center axis A1 of the bicycle front sprocket 16. An axial distance AD2 is defined from the abutment surface 30 to the axial tooth-center plane CP2 in the axial direction D2. The axial distance AD2 is equal to or larger than 1 mm. However, the axial distance is equal to or larger than approximately 1 mm. The axial distance AD2 is smaller than 5 mm. However, the axial distance AD2 can be smaller than approximately 5 mm. The axial distance AD2 can be equal to or larger than 5 mm.

Preferably, the axial distance AD2 is equal to or larger than 3 mm and is equal to or smaller than 4 mm. In this embodiment, the axial distance AD2 is 3.5 mm. However, the axial distance AD2 can be equal to or larger than approximately 3 mm and is equal to or smaller than approximately 4 mm. The axial distance AD2 can be smaller than 3 mm and can be larger than 4 mm.

Figure 12:
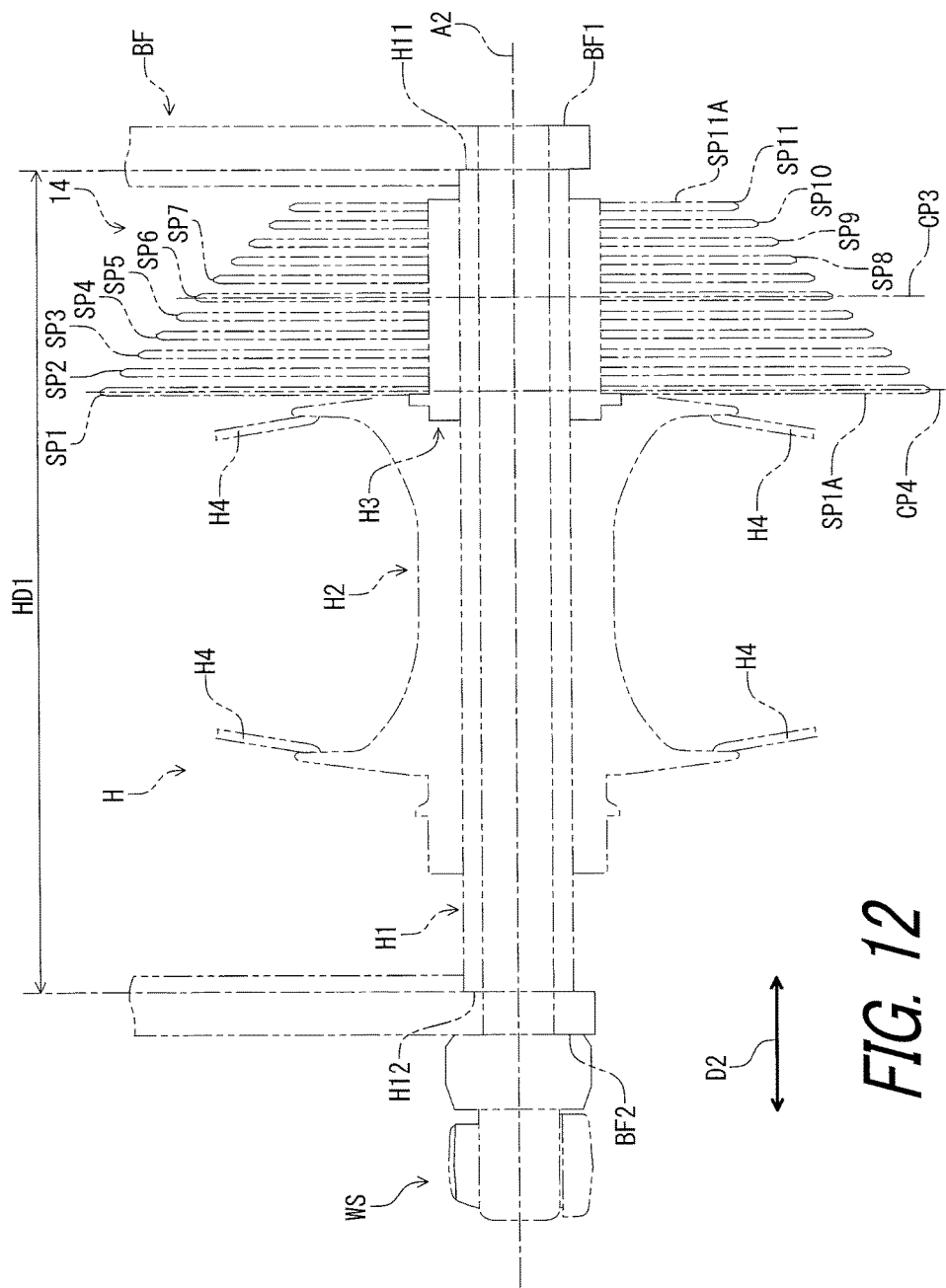
FIG. 12 is a schematic rear view of a multiple rear sprocket assembly of the bicycle drive train illustrated in FIG. 1, with a bicycle frame and a bicycle hub assembly.

As seen in FIG. 12, the multiple rear sprocket assembly 14 is configured to be rotatably supported around a hub axle H1 of a bicycle hub assembly H. The bicycle hub assembly H is detachably secured to the bicycle frame BF with a wheel securing device WS. The bicycle hub assembly H includes the hub axle H1, a hub shell H2, and a sprocket support body H3. The hub shell H2 is rotatably mounted on the hub axle H1 via bearing (not shown) and is coupled to a rim (not shown) with spokes H4. The sprocket support body H3 is rotatably mounted on the hub axle H1 via bearing (not shown). The sprocket support body H3 is coupled to the hub shell H2 via a ratchet structure (not shown). The multiple rear sprocket assembly 14 is mounted on the sprocket support body H3.

The hub axle H1 comprises a first axial frame abutment surface H11 and a second axial frame abutment surface H12. The first axial frame abutment surface H11 is configured to abut against a first part BF1 of the bicycle frame BF in the axial direction D2 in a state where the bicycle hub assembly H is mounted to the bicycle frame BF. The second axial frame abutment surface H12 is configured to abut against a second part BF2 of the bicycle frame BF in the axial direction D2 in the state where the bicycle hub assembly H is mounted to the bicycle frame BF. A hub axial distance HD1 is defined between the first axial frame abutment surface H11 and the second axial frame abutment surface H12 in the axial direction D2. The hub axial distance HD1 is larger than or equal to 146 mm. Preferably, the hub axial distance HD1 is equal to or smaller than 150 mm. In the illustrated embodiment, the hub axial distance HD1 is 148 mm. However, the hub axial distance HD1 can be larger than or equal to approximately 146 mm. The hub axial distance HD1 can be equal to or smaller than approximately 150 mm. The hub axial distance HD1 can be smaller than 146 mm. The hub axial distance HD1 can be larger than 150 mm.

As seen in FIG. 12, the multiple rear sprocket assembly 14 has an axially-disposed center plane CP3 defined to face in the axial direction D2 parallel to the rotational center axis A2 of the multiple rear sprocket assembly 14. The axially-disposed center plane CP3 is perpendicular to the rotational center axis A2 of the multiple rear sprocket assembly 14. The largest rear sprocket SP1 includes an axial innermost surface SP1A. The smallest rear sprocket SP11 includes an axial outermost surface SP11A. The axially-disposed center plane CP3 is defined at an axial center between the axial innermost surface SP1A and the axial outermost surface SP11A in the axial direction D2.

Figure 13:
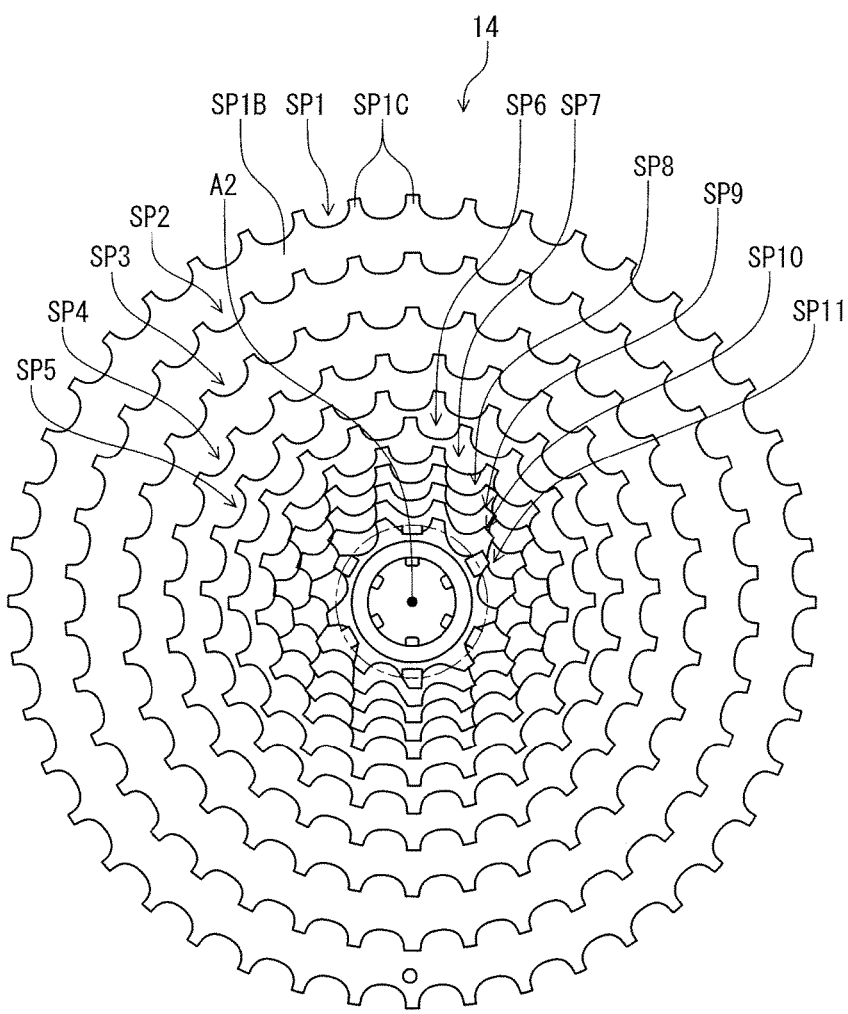
FIG. 13 is a side elevational view of the multiple rear sprocket assembly.

As seen in FIG. 13, the largest rear sprocket SP1 comprises a rear sprocket body SP1B and at least one rear sprocket tooth SP1C. In this embodiment, the largest rear sprocket SP1 comprises a plurality of rear sprocket teeth SP1C. The rear sprocket teeth SP1C extend radially outwardly from the rear sprocket body SP1B.

Figure 14:
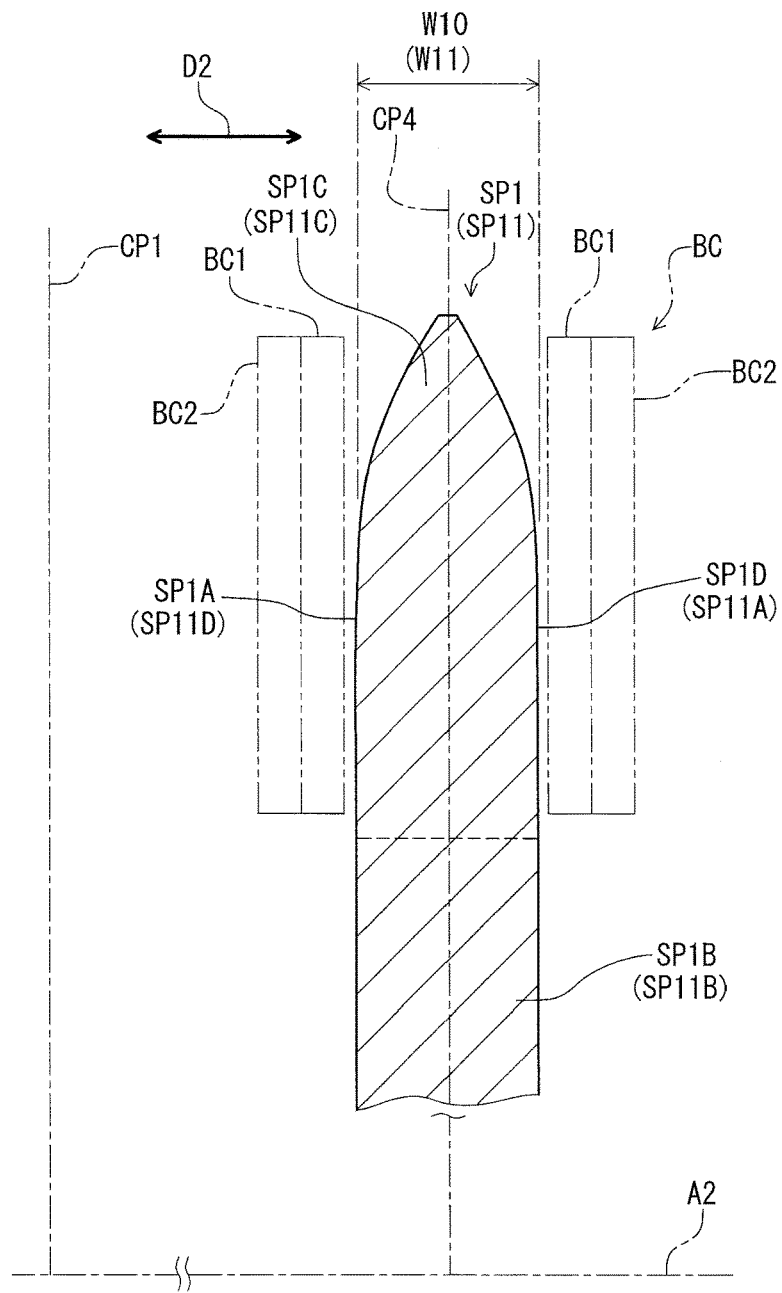
FIG. 14 is a partial cross-sectional view of a rear sprocket of the multiple rear sprocket assembly.

As seen in FIG. 14, at least one rear sprocket tooth SP1C has an axial rear-tooth-center plane CP4 defined to bisect a maximum axial width W10 of the at least one rear sprocket tooth SP1C. The sprocket teeth SP1C have the axial rear-tooth-center plane CP4 defined to bisect the maximum axial width of the rear sprocket teeth SP1C. In this embodiment, the rear sprocket tooth SP1C includes the axial innermost surface SP1A and a chain engaging surface SP1D. The axial innermost surface SP1A faces in the axial direction D2. The additional chain engaging surface SP1D faces in the axial direction D2 and is provided on a reverse side of the axial innermost surface SP1A. The maximum axial width W10 is defined between the axial innermost surface SP1A and the chain engaging surface SP1D in the axial direction D2.

Similarly, as seen in FIG. 13, the smallest rear sprocket SP11 comprises a rear sprocket body SP11B and at least one rear sprocket tooth SP11C. In this embodiment, the smallest rear sprocket SP11 comprises a plurality of rear sprocket teeth SP11C. The rear sprocket teeth SP11C extend radially outwardly from the rear sprocket body SP11B.

As seen in FIG. 14, the rear sprocket tooth SP11C includes the axial outermost surface SP11A and a chain engaging surface SP11D. The axial outermost surface SP11A faces in the axial direction D2. The additional chain engaging surface SP11D faces in the axial direction D2 and is provided on a reverse side of the axial outermost surface SP11A. A maximum axial width W11 is defined between the axial outermost surface SP11A and the chain engaging surface SP11D in the axial direction D2.

As seen in FIG. 6, the axial tooth-center plane CP2 is axially outwardly spaced apart from the axially-disposed center plane CP3 by an axial distance AD3 equal to or smaller than 4 mm in the axial direction D2 in a state where the multiple rear sprocket assembly 14 is rotatably supported around the hub axle H1 (FIG. 12). The axial tooth-center plane CP2 can be axially outwardly spaced apart from the axially-disposed center plane CP3 by the axial distance AD3 equal to or smaller than approximately 4 mm in the axial direction D2 in the state where the multiple rear sprocket assembly 14 is rotatably supported around the hub axle H1.

As seen in FIG. 1, the largest rear sprocket SP1 is positioned axially inwardly from the bicycle front sprocket 16 in the axial direction D2. The largest rear sprocket SP1 is positioned closer to the axial bicycle-center plane CP1 than the bicycle front sprocket 16 in the axial direction D2.

As seen in FIG. 6, an axial tooth distance AD4 is defined between the axial front-tooth-center plane CP2 and the axial rear-tooth-center plane CP4. The axial tooth distance AD4 is equal to or smaller than 22 mm in a state where the multiple rear sprocket assembly 14 is rotatably supported around the hub axle H1. However, the axial tooth distance AD4 is equal to or smaller than approximately 22 mm in the state where the multiple rear sprocket assembly 14 is rotatably supported around the hub axle H1.

Preferably, the axial tooth distance AD4 is equal to or larger than 17 mm. However, the axial tooth distance AD4 can be equal to or larger than approximately 17 mm. The axial tooth distance AD4 can be smaller than 17 mm. More preferably, the axial tooth distance AD4 is equal to or smaller than 19 mm. However, the axial tooth distance AD4 can be equal to or smaller than approximately 19 mm. The axial tooth distance AD4 can be larger than 19 mm. More preferably, the axial tooth distance AD4 is equal to or larger than 18 mm and is equal to or smaller than 19 mm. In this embodiment, the axial tooth distance AD4 is 18.2 mm.

As seen in FIG. 6, an axial distance AD5 is defined from the axial tooth-center plane CP2 to the axial bicycle-center plane CP1 defined to bisect the bicycle frame BF in the axial direction D2. The axial distance AD5 is equal to or smaller than 48 mm in the state where the bicycle front sprocket 16 is mounted to the bicycle frame BF. Preferably, the axial distance AD5 is equal to or larger than 43 mm in the state where the bicycle front sprocket 16 is mounted to the bicycle frame BF. More preferably, the axial distance AD5 is equal to or larger than 45 mm and equal to or smaller than 47 mm in the state where the bicycle front sprocket 16 is mounted to the bicycle frame BF. However, the axial distance AD5 can be equal to or smaller than approximately 48 mm in the state where the bicycle front sprocket 16 is mounted to the bicycle frame BF. The axial distance AD5 can be equal to or larger than approximately 43 mm in the state where the bicycle front sprocket 16 is mounted to the bicycle frame BF. The axial distance AD5 can be equal to or larger than approximately 45 mm and equal to or smaller than approximately 47 mm in the state where the bicycle front sprocket 16 is mounted to the bicycle frame BF. More preferably, the axial distance AD5 is equal to or larger than 45 mm and is equal to or smaller than 47 mm. In this embodiment, the axial distance AD5 is 46 mm.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle front sprocket comprising:
   a sprocket body including a crank arm mounting portion to be mounted to a bicycle crank arm, the crank arm mounting portion including a first mounting axial surface facing toward an axial bicycle-center plane in an axial direction parallel to a rotational center axis of the bicycle front sprocket in a state where the bicycle front sprocket is mounted to a bicycle frame, the axial bicycle-center plane being defined to bisect the bicycle frame in the axial direction; and
   at least one sprocket tooth having a first chain-engagement axial surface facing toward the axial bicycle-center plane in the axial direction in a state where the bicycle front sprocket is mounted to the bicycle frame, the first chain-engagement axial surface being offset from the first mounting axial surface toward the axial bicycle-center plane in the axial direction, an axial distance being defined from the first mounting axial surface to the first chain-engagement axial surface in the axial direction, the axial distance being equal to or larger than 6 mm, wherein
   an axially inner most portion of the first mounting axial surface is spaced axially outwardly from an entirety of every front sprocket tooth in the axial direction.

2. The bicycle front sprocket according to claim 1, wherein
   the axial distance is equal to or smaller than 22.5 mm.

3. The bicycle front sprocket according to claim 2, wherein
   the axial distance is equal to or smaller than 11 mm.

4. The bicycle front sprocket according to claim 1, wherein
   the axial distance is equal to or smaller than 9.5 mm and is equal to or larger than 8 mm.

5. The bicycle front sprocket according to claim 1, wherein
   the at least one front sprocket tooth includes
      at least one first tooth having a first chain engaging width defined in the axial direction, and
      at least one second tooth having a second chain engaging width defined in the axial direction, the second chain engaging width being smaller than the first chain engaging width.

6. The bicycle front sprocket according to claim 5, wherein
   the at least one first tooth has the first chain-engagement axial surface.

7. The bicycle front sprocket according to claim 5, wherein
   the axial distance is equal to or larger than three times of the second chain engaging width.

8. The bicycle front sprocket according to claim 5, wherein the first chain engaging width is larger than an inner link space defined between an opposed pair of inner link plates of a bicycle chain and is smaller than an outer link space defined between an opposed pair of outer link plates of the bicycle chain, and the second chain engaging width is smaller than the inner link space.

9. The bicycle front sprocket according to claim 1, wherein the sprocket body includes a radially extending portion extending from the crank arm mounting portion toward an outer periphery of the sprocket body in a radial direction perpendicular to the rotational center axis.

10. The bicycle front sprocket according to claim 9, wherein the radially extending portion includes at least four radially extending arms, and the radially extending arms are spaced apart from each other in a circumferential direction defined about the rotational center axis.

11. The bicycle front sprocket according to claim 1, wherein the crank arm mounting portion includes a plurality of mounting teeth configured to engage with a mounting boss of the bicycle crank arm in a state where the bicycle front sprocket is mounted to the bicycle crank arm.

12. The bicycle front sprocket according to claim 1, wherein the bicycle front sprocket is a solitary front sprocket.

13. A bicycle crank assembly comprising:
a bicycle front sprocket comprising:
    a sprocket body including a crank arm mounting portion to be mounted to a bicycle crank arm; and
    at least one front sprocket tooth having an axial tooth-center plane defined to bisect a maximum axial width of the at least one front sprocket tooth; and
a bicycle crank arm comprising:
    an arm body; and
    an abutment surface facing toward a bicycle bottom bracket assembly in an axial direction parallel to a rotational center axis of the bicycle front sprocket to abut against the bicycle bottom bracket assembly, the axial tooth-center plane being positioned farther from the arm body than the abutment surface in the axial direction, an axial distance being defined from the abutment surface to the axial tooth-center plane in the axial direction, the axial distance being equal to or larger than 1 mm, wherein
the abutment surface is spaced axially outwardly from an entirety of every front sprocket tooth in the axial direction and spaced axially inwardly of the crank arm mounting portion.

14. The bicycle crank assembly according to claim 13, wherein the axial distance is smaller than 5 mm.

15. The bicycle crank assembly according to claim 13, wherein the axial distance is equal to or larger than 3 mm and is equal to or smaller than 4 mm.

16. The bicycle crank assembly according to claim 13, wherein the bicycle front sprocket is a solitary front sprocket.

17. A bicycle drive train comprising:
the bicycle crank assembly according to claim 13; and
a multiple rear sprocket assembly including a plurality of bicycle rear sprockets.

18. The bicycle drive train according to claim 17, wherein the plurality of bicycle rear sprockets includes nine rear sprockets.

19. The bicycle drive train according to claim 17, wherein the plurality of bicycle rear sprockets includes eleven rear sprockets.

20. The bicycle drive train according to claim 17, wherein the plurality of the bicycle rear sprockets includes twelve rear sprockets.

21. A bicycle drive train comprising:
a bicycle crank arm assembly comprising a bicycle front sprocket comprising:
    a sprocket body; and
    at least one sprocket tooth having an axial tooth-center plane defined to bisect a maximum axial width of the at least one sprocket tooth; and
a multiple rear sprocket assembly configured to be rotatably supported around a hub axle of a bicycle hub assembly, the multiple rear sprocket assembly having an axially-disposed center plane defined to face in an axial direction parallel to a rotational center axis of the multiple rear sprocket assembly, the axial tooth-center plane being axially outwardly spaced apart from the axially-disposed center plane by an axial distance equal to or smaller than 4 mm in the axial direction in a state where the multiple rear sprocket assembly is rotatably supported around the hub axle, an axial bicycle-center plane defined to bisect the bicycle frame in the axial direction being closer to the axially-disposed center plane than the axial tooth-center plane, the hub axle comprising:
    a first axial frame abutment surface configured to abut against a first part of a bicycle frame in the axial direction in a state where the bicycle hub assembly is mounted to the bicycle frame; and
    a second axial frame abutment surface configured to abut against a second part of the bicycle frame in the axial direction in the state where the bicycle hub assembly is mounted to the bicycle frame, a hub axial distance being defined between the first axial frame abutment surface and the second axial frame abutment surface in the axial direction, the hub axial distance being larger than or equal to 146 mm.

22. The bicycle drive train according to claim 21, wherein the bicycle front sprocket is a solitary front sprocket.

23. A bicycle drive train comprising:
a bicycle crank arm assembly comprising a bicycle front sprocket comprising:
    a front sprocket body; and
    at least one front sprocket tooth having an axial front-tooth-center plane defined to bisect a maximum axial width of the at least one front sprocket tooth;
a multiple rear sprocket assembly configured to be rotatably supported around a hub axle, the multiple rear sprocket assembly having an axially-disposed center plane defined to face in an axial direction parallel to a rotational center axis of the multiple rear sprocket assembly, the multiple rear sprocket assembly comprising a largest rear sprocket comprising:
    a rear sprocket body; and
    at least one rear sprocket tooth having an axial rear-tooth-center plane defined to bisect a maximum axial width of the at least one rear sprocket tooth, the largest rear sprocket being positioned axially inwardly from the bicycle front sprocket in the axial direction, an axial tooth distance being defined between the axial front-tooth-center plane and the axial rear-tooth-center plane, the axial tooth distance being equal to or smaller than 22 mm in a state where the multiple rear sprocket assembly is rotatably supported around the hub axle, the axially-disposed center plane being disposed between the axial front-tooth-center plane and the axial rear-tooth-center plane in the axial direction, the axially-disposed center plane being disposed so as to not overlap any front sprocket tooth, the hub axle comprising:

a first axial frame abutment surface configured to abut against a first part of a bicycle frame in the axial direction in a state where the bicycle hub assembly is mounted to the bicycle frame; and a second axial frame abutment surface configured to abut against a second part of the bicycle frame in the axial direction in the state where the bicycle hub assembly is mounted to the bicycle frame, a hub axial distance being defined between the first axial frame abutment surface and the second axial frame abutment surface in the axial direction, the hub axial distance being larger than or equal to 146 mm.

24. The bicycle drive train according to claim 23, wherein the bicycle front sprocket is a solitary front sprocket.

25. The bicycle drive train according to claim 23, wherein the axial tooth distance is equal to or larger than 17 mm.

26. The bicycle drive train according to claim 23, wherein the axial tooth distance is equal to or smaller than 19 mm.

27. A bicycle front sprocket comprising:

a sprocket body including a crank arm mounting portion to be mounted to a bicycle crank arm, the crank arm mounting portion including a first mounting axial surface facing toward an axial bicycle-center plane in an axial direction parallel to a rotational center axis of the bicycle front sprocket in a state where the bicycle front sprocket is mounted to a bicycle frame, the axial bicycle-center plane being defined to bisect the bicycle frame in the axial direction; and at least one front sprocket tooth having an axial tooth-center plane defined to bisect a maximum axial width of the at least one front sprocket tooth, an axial distance being defined from the axial tooth-center plane to the axial bicycle-center plane, the axial distance being equal to or smaller than 48 mm in a state where the bicycle front sprocket is mounted to the bicycle frame, wherein an axially inner most portion of the first mounting axial surface is spaced axially outwardly from an entirety of every front sprocket tooth in the axial direction.

28. The bicycle front sprocket according to claim 1, wherein an entirety of the axially inner most portion of the crank mounting portion is disposed axially outwardly of every front sprocket tooth so as not to overlap any front sprocket tooth in a direction parallel to the axial bicycle-center plane.

29. The bicycle front sprocket according to claim 13, wherein an entirety of the abutment surface is disposed axially outwardly of every front sprocket tooth so as not to overlap any front sprocket tooth in a direction parallel to the axial bicycle-center plane.

30. The bicycle drive train according to claim 21, wherein the axially-disposed center plane is disposed between the axial tooth-center plane and an axial rear-tooth-center plane defined to bisect a maximum axial width of the at least one rear sprocket tooth of a largest rear sprocket, in the axial direction, the axially-disposed center plane being disposed so as not to overlap any sprocket tooth of the bicycle front sprocket.

31. The bicycle drive train according to claim 23, wherein an axial bicycle-center plane defined to bisect the bicycle frame in the axial direction is closer to the axially-disposed center plane than an axially inward-most surface of every front sprocket tooth.

\* \* \* \* \*